United States Patent
Zhang et al.

(10) Patent No.: US 8,842,613 B2
(45) Date of Patent: Sep. 23, 2014

(54) POWER ALLOCATION IN MULTI-CARRIER ENHANCED UPLINK

(75) Inventors: Danlu Zhang, San Diego, CA (US);
Aziz Gholmieh, Del Mar, CA (US);
Ravi Agarwal, San Diego, CA (US);
Pavan Kumar Vitthaladevuni, San Diego, CA (US); Ozcan Ozturk, San Diego, CA (US); Sharad D. Sambhwani, San Diego, CA (US); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/701,975

(22) Filed: Feb. 8, 2010

(65) Prior Publication Data

US 2010/0202392 A1 Aug. 12, 2010

Related U.S. Application Data

(60) Provisional application No. 61/150,950, filed on Feb. 9, 2009, provisional application No. 61/160,393, filed on Mar. 16, 2009, provisional application No. 61/218,543, filed on Jun. 19, 2009, provisional application No. 61/234,805, filed on Aug. 18, 2009, provisional application No. 61/236,775, filed on Aug. 25, 2009, provisional application No. 61/247,266, filed on Sep. 30, 2009, provisional application No. 61/248,817, filed on Oct. 5, 2009, provisional application No. 61/257,370, filed on Nov. 2, 2009.

(51) Int. Cl.
| | |
|---|---|
| *H04W 4/00* | (2009.01) |
| *H04L 12/26* | (2006.01) |
| *H04W 52/28* | (2009.01) |
| *H04W 52/34* | (2009.01) |
| *H04W 52/48* | (2009.01) |
| *H04L 5/00* | (2006.01) |
| *H04B 7/08* | (2006.01) |
| *H04B 7/06* | (2006.01) |

(52) U.S. Cl.
CPC .......... *H04W 52/286* (2013.01); *H04W 52/346* (2013.01); *H04L 5/0046* (2013.01); *H04B 7/0848* (2013.01); *H04W 52/48* (2013.01); *H04B 7/0617* (2013.01); *H04W 52/34* (2013.01)
USPC .......................................... 370/329; 370/252

(58) Field of Classification Search
USPC .............. 370/203, 204, 310–350, 395.4, 431, 370/464, 465, 466
See application file for complete search history.

(56) References Cited

U.S. PATENT DOCUMENTS 7,613,157 B2 * 11/2009 Pan et al. ...................... 370/341
8,169,953 B2   5/2012 Damnjanovic et al.

(Continued)

FOREIGN PATENT DOCUMENTS

| | | |
|---|---|---|
| CN | 1894864 A | 1/2007 |
| CN | 2896706 Y | 5/2007 |

(Continued)

OTHER PUBLICATIONS

CMCC: "Multicarrier Operation and PDCCH design of Carrier Aggregation" 3GPP Draft; R1-084333, 3rd Generation Partnership Project (3GPP), Mobile Competence Centre; 650, Route Des Lucioles; F-06921 Sophia-Antipolis Cedex; France, no. Prague, Czech Republic; Nov. 4, 2008, XP050317608 [retrieved on Nov. 4, 2008] the whole document.

(Continued)

*Primary Examiner* — Warner Wong
(74) *Attorney, Agent, or Firm* — Charles Chesney

(57) ABSTRACT

Systems and methodologies are described that facilitate split a common total power resource among a plurality of carriers. A power distribution scheme can be employed jointly across the plurality of carriers to determine an amount of power to allocate to respective carriers. Based upon an amount of power allocated, a packet format can be selected for each carrier based upon the amount of power allocated to the carrier and/or a serving grant associated with the carrier.

55 Claims, 13 Drawing Sheets

(56) References Cited

U.S. PATENT DOCUMENTS

| | | | |
|---|---|---|---|
| 8,295,779 B2* | 10/2012 | Cave et al. ............... | 455/69 |
| 2001/0031014 A1 | 10/2001 | Subramanian et al. | |
| 2003/0128665 A1 | 7/2003 | Bernhard et al. | |
| 2005/0031047 A1* | 2/2005 | Maltsev et al. ............... | 375/260 |
| 2005/0032514 A1 | 2/2005 | Sadri et al. | |
| 2005/0043034 A1 | 2/2005 | Abdel-Ghaffar et al. | |
| 2005/0099937 A1* | 5/2005 | Oh et al. ............... | 370/207 |
| 2006/0023629 A1* | 2/2006 | Kim et al. ............... | 370/235 |
| 2006/0203724 A1* | 9/2006 | Ghosh et al. ............... | 370/229 |
| 2006/0268938 A1 | 11/2006 | Terry | |
| 2007/0070908 A1 | 3/2007 | Ghosh et al. | |
| 2007/0140179 A1* | 6/2007 | Zhang et al. ............... | 370/335 |
| 2007/0232318 A1 | 10/2007 | Nobukiyo | |
| 2008/0037413 A1* | 2/2008 | Gu et al. ............... | 370/210 |
| 2008/0089296 A1* | 4/2008 | Kazmi et al. ............... | 370/336 |
| 2008/0130672 A1* | 6/2008 | Yue et al. ............... | 370/431 |
| 2008/0151819 A1 | 6/2008 | Bachl et al. | |
| 2008/0214229 A1* | 9/2008 | Lim et al. ............... | 455/522 |
| 2009/0161632 A1* | 6/2009 | Palenius et al. ............ | 370/335 |
| 2009/0185531 A1* | 7/2009 | Chun et al. ............... | 370/329 |
| 2010/0091754 A1* | 4/2010 | Ishii ............... | 370/342 |
| 2010/0111023 A1* | 5/2010 | Pelletier et al. ............ | 370/329 |
| 2010/0113004 A1* | 5/2010 | Cave et al. ............... | 455/422.1 |
| 2010/0128663 A1* | 5/2010 | Kuroda et al. ............... | 370/328 |
| 2010/0157895 A1* | 6/2010 | Pani et al. ............... | 370/328 |
| 2010/0202394 A1 | 8/2010 | Zhang et al. | |
| 2010/0272078 A1* | 10/2010 | Pani et al. ............... | 370/336 |
| 2011/0032885 A1* | 2/2011 | Wang et al. ............... | 370/329 |
| 2011/0044222 A1 | 2/2011 | Gerstenberger et al. | |
| 2011/0081940 A1 | 4/2011 | Gerstenberger et al. | |
| 2011/0090806 A1* | 4/2011 | Ozturk et al. ............... | 370/252 |
| 2012/0002630 A1* | 1/2012 | Bergman et al. ............... | 370/329 |
| 2012/0008563 A1* | 1/2012 | Johansson et al. ............ | 370/328 |
| 2013/0003665 A1* | 1/2013 | Pelletier et al. ............ | 370/329 |

FOREIGN PATENT DOCUMENTS

| | | |
|---|---|---|
| EP | 1793509 A1 | 6/2007 |
| EP | 1971095 A1 | 9/2008 |
| EP | 2129139 A1 | 12/2009 |
| JP | 2006237897 A | 9/2006 |
| JP | 2008537448 A | 9/2008 |
| JP | 2008539668 A | 11/2008 |
| WO | 2006113712 A1 | 10/2006 |
| WO | WO2006118831 | 11/2006 |
| WO | 2008105316 A1 | 9/2008 |

OTHER PUBLICATIONS

Huawei: "PDCCH on Carrier Aggregation" 3GPP Draft; R1-083705 PDCCH on Carrier Aggregation, 3rd Generation Partnership Project (3GPP), Mobile Competence Centre; 650, Route Des Lucioles ; F-06921 Sophia-Antipolis Cedex; France, No. Prague, Czech Republic; Sep. 24, 2008, XP050317047 [retrieved on Sep. 24, 2008] Section 3, "Anchor carrier".

International Search Report & Written Opinion—PCT/US2010/023651, International Search Authority—European Patent Office—May 6, 2010.

International Search Report and Written Opinion—PCT/US2010/023660, International Search Authority—European Patent Office—May 21, 2010.

Nokia Siemens Networks et al: "Primary Component Carrier Selection, Monitoring, and Recovery" 3GPP Draft; R1-090735_PRIMARYCCSELECT, 3rd Generation Partnership Project (3GPP), Mobile Competence Centre; 650, Route Des Lucioles; F-06921 Sophia-Antipolis Cedex; France, No. Athens, Greece; Feb. 3, 2009, XP050318599.

Zhang D et al: "HSUPA Scheduling Algorithms Utilizing RoT Measurements and Interference Cancellations" Communications, 2008. ICC 08. IEEE International Conference on, IEEE, Piscataway, NJ, USA, May 19, 2008, pp. 5033-5037, XP031266265 ISBN: 978-1-4244-2075-9 abstract p. 5034, right-hand column, paragraph 2nd but last.

3rd Generation Partnership Project; Technical Specification Group Radio access Network; MAC protocol specification (Release 8) 3GPP TS 25.321 V8.4.0, Dec. 2008, pp. 1-174.

Alcatel-Lucent "A comparison between Sequential and Parallel Power Allocation in E-TFC Selection for DC-HSUPA", 3GPP TSG-RAN WG2 meeting #67, R2-094237, Shenzhen, China, Aug. 24-28, 2009, pp. 1-12.

Ericsson: "E-TFC selection for DC-HSUPA" , 3GPP Draft; R2-092942 , E-TFC_Selection_For_DC-HSUPA, 3rd , Generation Partnership Project (3GPP), Mobile Competence Centre ; 650, Route Des Lucioles ; F-06921 Sophiaantipolis Cedex ; France, No. San Francisco, USA; Apr. 28, 2009, XP050340739 [retrieved on Apr. 28, 2009] section 2.1.2 section 2.2.1.

ETSI MCC "Report of 3GPP TSG RAN WG2 meeting #67", R2-095433, Shenzhen, China, Aug. 24-28, 2009.

3GPP: "Universal Mobile Telecommunications System (UMTS); Medium Access Control (MAC) protocol specification (Release 6)", Technical Specification, 3rd Generation Partnership Project; Technical Specification Group Radio Access Network, 3GPP TS 25.321 V6.10.0 (Sep. 2006), pp. 93.

Motorola: "UL-MIMO with Antenna Gain Imbalance" , 3GPP Draft; R1-090327 UL-MIMO With AGI (Motorola) Final, 3rd Generation Partnership Project (3GPP), Mobile Competence Centre ; 650, Route Des Lucioles ; F-06921 Sophia-Antipolis Cedex ; France, No. Ljubljana; Jan. 7, 2009, XP050318238, [ retrieved on Jan. 7, 2009] the whole document.

Ruberg A., "Frequency Domain Link Adaptation for OFDM-based Cellular Packet Data", Department of Electrical Engineering, Linkopings Universitet, pp. 95, Dec. 31, 2006.

Taiwan Search Report—TW099104076—TIPO—Jun. 10, 2013.

* cited by examiner

POWER ALLOCATION IN MULTI-CARRIER ENHANCED UPLINK

CLAIM OF PRIORITY UNDER 35 U.S.C. §119

The present application for patent claims priority to U.S. Provisional Application Ser. No. 61/150,950, filed Feb. 9, 2009, entitled "DATA RATE SELECTION BASED ON SCHEDULING GRANT," U.S. Provisional Application Ser. No. 61/160,393, filed Mar. 16, 2009, entitled "DATA RATE SELECTION BASED ON SCHEDULING GRANT," U.S. Provisional Application Ser. No. 61/218,543, filed Jun. 19, 2009, entitled "DATA RATE SELECTION BASED ON SCHEDULING GRANT," U.S. Provisional Application Ser. No. 61/234,805, filed Aug. 18, 2009, entitled "DATA RATE SELECTION BASED ON SCHEDULING GRANT," U.S. Provisional Application Ser. No. 61/236,775, filed Aug. 25, 2009, entitled "DATA RATE SELECTION BASED ON SCHEDULING GRANT," U.S. Provisional Application Ser. No. 61/247,266, filed Sep. 30, 2009, entitled "DATA RATE SELECTION BASED ON SCHEDULING GRANT," U.S. Provisional Application Ser. No. 61/248,817, filed Oct. 5, 2009, entitled "DATA RATE SELECTION BASED ON SCHEDULING GRANT," and U.S. Provisional Application Ser. No. 61/257,370, filed Nov. 2, 2009, entitled "ESTIMATING A NORMALIZED POWER REMAINING MARGIN." The aforementioned U.S. Provisional applications are assigned to the assignee hereof and hereby expressly incorporated by reference in their entirety.

BACKGROUND

I. Field

The following description relates generally to wireless communications, and more particularly to distributing power for uplink transmissions among a plurality of carriers and selecting packet formats in accordance with an implemented power distribution.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As wireless communications continue to grow in popularity, consumers demand additional features and greater performance. Such features can require high data rates, which can be difficult to achieve with a limited bandwidth or spectrum. One option to increase bandwidth (e.g., widen bandwidth), without a large impact on the complexity of radio equipment (e.g., transmitters and receivers), is to implement carrier aggregation. With carrier aggregation, multiple component carriers can be aggregated or grouped to result in an overall wider system bandwidth. Each component carrier can include a complete downlink and uplink with control and traffic channels. Thus, each component carrier can appear as an individual deployment of a wireless communication technology.

Wireless communication devices (e.g., base stations, mobile terminals, etc.) can be configured to utilize multiple component carriers to transmit data. For instance, a base station and mobile terminal can be configured to respectively transmit and receive data on downlinks of multiple carriers. In addition, the mobile terminal can be configured to utilize a plurality of uplink frequencies on multiple uplink carriers. Accordingly, higher data rates and greater overall throughput can be achieved without a large impact on equipment complexity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method is provided that includes determining a total power available for high speed uplink packet transmissions, wherein the total power available is shared by a plurality of carriers. The method also includes distributing the total power available across the plurality of carriers, wherein a power distribution of the total power available is jointly determined. In addition, the method can include selecting a packet format for a carrier from the plurality of carriers, wherein selecting is based at least in part on a serving grant associated with the carrier and an amount of power allocated to the carrier.

Another aspect relates to a wireless communications apparatus. The wireless communications apparatus can include at least one processor configured to identify a total power available for high speed uplink packets transmissions, wherein the total power available is shared by a plurality of carriers. The at least one processor is further configured to split the total power available across the plurality of carriers in accordance with a power distribution scheme. In addition, the at least one processor is further configured to choose a packet format for a carrier from the plurality of carriers based at least in part on a serving grant associated with the carrier and an amount of power allocated to the carrier.

Yet another aspect relates to an apparatus. The apparatus includes means for determining a total power available for high speed uplink packet transmissions, wherein the total power available is shared by a plurality of carriers. The apparatus can also include means for distributing the total power available across the plurality of carriers, wherein a power distribution of the total power available is jointly determined. Further, the apparatus includes means for selecting a packet format for a carrier from the plurality of carriers, wherein selecting is based at least in part on a serving grant associated with the carrier and an amount of power allocated to the carrier.

Still another aspect relates to a computer program product, which can have a computer-readable medium including code for causing the at least one computer to identify a total power available for high speed uplink packets transmissions, wherein the total power available is shared by a plurality of carriers. The computer-readable medium can also comprise code for causing at least one computer to split the total power available across the plurality of carriers in accordance with a power distribution scheme. In addition, the computer-readable medium can include code for causing at least one computer to choose a packet format for a carrier from the plurality of carriers based at least in part on a serving grant associated with the carrier and an amount of power allocated to the carrier.

Moreover, an additional aspect relates to an apparatus that includes a power split module that distributes a total available power among a plurality of component carriers in accordance with a power distribution scheme. The apparatus can also include a format evaluation module that categorizes a set of packet formats for a component carrier in the plurality of component carriers based at least in part on a power requirement of each packet format and an amount of power allocated to the component carrier by the power split module. In addition, the apparatus can include a format selection module that chooses a packet format from the set of packet formats for utilization in an uplink transmission on the component carrier.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
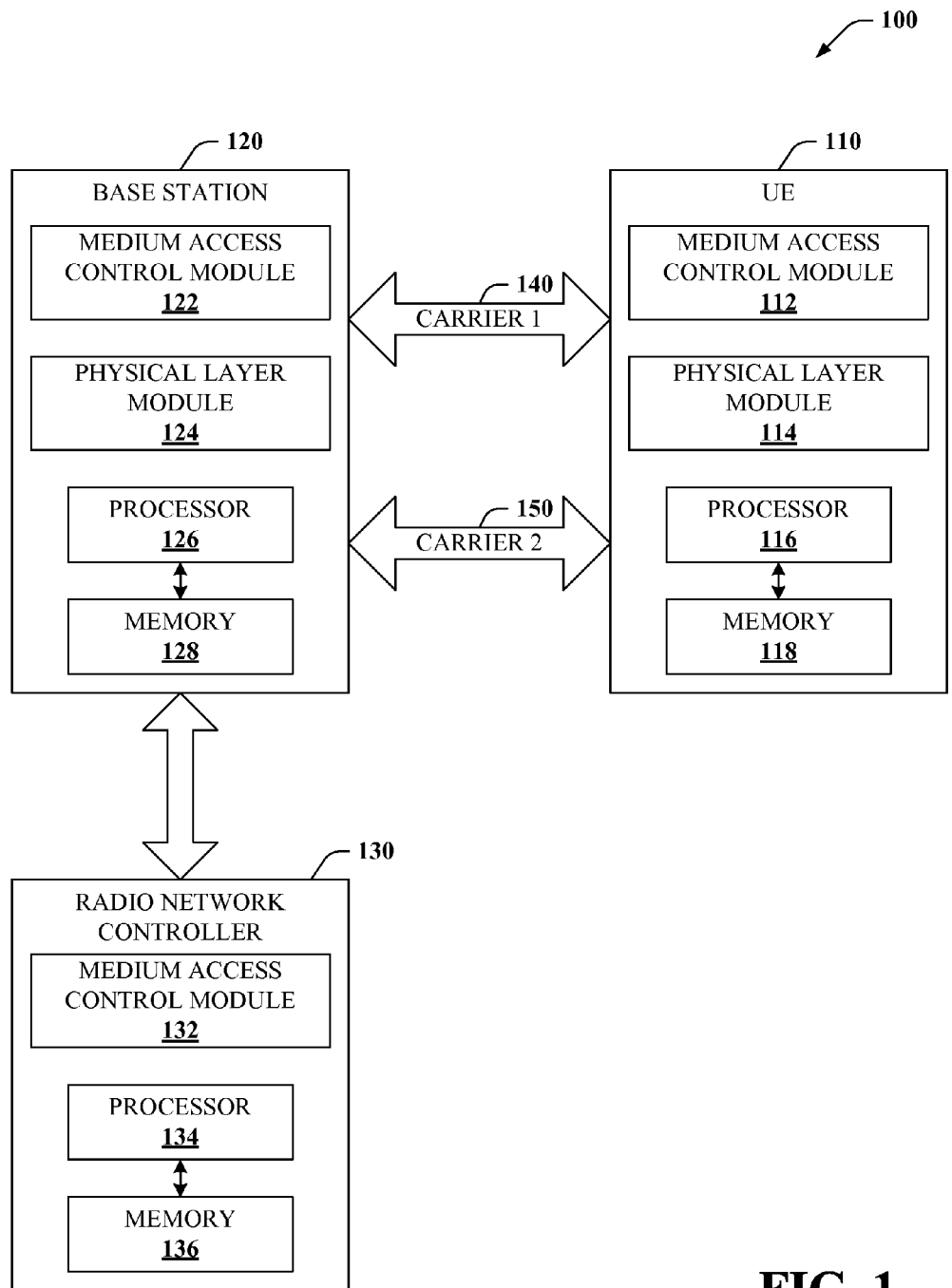
FIG. 1 illustrates an example wireless communication system that employs multiple component carriers to facilitate higher uplink data rates in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to drawings, FIG. 1 illustrates an example wireless communication system 100 that employs multiple component carriers to facilitate higher uplink data rates in accordance with various aspects. Wireless communication system 100 includes user equipment (UE) 110 and base station 120 that communicate with one another over a wireless link. In one example, base station 120 can be an access point, such as a macrocell access point, femtocell or picocell access point, a NodeB, an eNodeB (eNB), a mobile base station, a portion thereof, and/or substantially any device or apparatus that provides access to a wireless communication network. While only UE 110 and base station 120 are illustrated in FIG. 1, it should be appreciated that system 100 can include any number of UEs and/or base stations. In accordance with an aspect, base station 120 can transmit information to UE 110 over a forward link or downlink channel and UE 110 can transmit information to base station 120 over a reverse link or uplink channel. It should be appreciated that system 100 can operate in an WCDMA wireless network, an OFDMA wireless network, a CDMA network, a 3GPP LTE or LTE-A wireless network, a 3GPP2 CDMA2000 network, an EV-DO network, a WiMAX network, a HSPA network, etc.

System 100 can further include radio network controller (RNC) 130 which can control one or more base stations, such as base station 120. RNC 130 can handle call setup, quality-of-service (QoS), radio resource management, automatic repeat request (ARQ) protocol, and the like. In addition, RNC 130 is connected to the Internet and the public switched telephone network via a core network (not shown).

In accordance with an aspect, UE 110 and base station 120 can be configured to employ multiple component carriers. For example, UE 110 and base station 120 can communicate via carrier 140 and carrier 150. While only two carriers are depicted in FIG. 1, it is to be appreciated that UE 110 and base station 120 can be configured to operate with more than two carriers.

Each of carriers 140 and 150 can encapsulate a complete radio interface. For instance, carriers 140 and 150 can respectively include a WCDMA/HSPA radio interface, such that each carrier 140 and 150 include a plurality of downlink and uplink logical, transport, and physical channels, such as, but not limited to, a dedicated channel (DCH), an enhanced dedicated channel (E-DCH), a high-speed downlink shared channel (HS-DSCH), a high-speed shared control channel (HS-SCCH), a broadcast channel (BCH), a downlink shared channel (DSCH), and the like. Thus, UE 110 can receive complete wireless communication services via carrier 140 or carrier 150. In addition, greater data rates can be achieved through utilization of both carriers 140 and 150 in parallel.

In an aspect, UE 110 can be configured (e.g., by base station 120 and/or RNC 130) to utilize both carriers 140 and 150 in connection with high-speed uplink packet access (HSUPA). HSUPA provides enhanced uplink channels that UE 110 can employ to increase uplink capacity, uplink data throughput, and uplink performance (e.g., reduce delay). In accordance with an example, HSUPA or Enhanced Uplink provides a set of features to increase uplink capabilities. For instance, HSUPA provides scheduling at the NodeB or base station, hybrid ARQ, higher order modulation, transmission time interval (TTI) options, etc.

In an aspect, UE 110 can include a medium access control (MAC) module 112, which implements MAC layer features. The MAC module 112 can provide services to upper layers (e.g., radio link control (RLC), etc.) via logical channels such as, but not limited to, a dedicated control channel (DCCH) and a dedicated traffic channel (DTCH). In one example, the MAC module 112 can perform packet format selection, and multiplexing of one or more flows (e.g., data flows on the logical channels) into a selected packet format. UE 110 can also include a physical layer module 114 which implements physical layer aspects of uplink transmissions. For instance, the physical layer module 114 can perform coding of transport blocks, transport channel multiplexing, modulation of a radio frequency carrier, insertion of a cyclic redundancy check (CRC), spreading bits to a chip rate, and the like. In an example, the MAC module 112 can select a packet format and multiplex one or more data flows into the selected packet format in accordance with priorities associated with respective data flows to generate a transport block. The physical layer module 114 can attach a CRC to the transport block. After CRC attachment, the physical layer module 114 can encode the transport block. For instance, the physical layer module 114 can employ turbo coding or convolutional coding. The coded transport block can be interleaved and rate matching can be performed. Multiple coded and interleaved transport blocks can be multiplexed and modulated to generate a stream of modulation symbols. The modulation symbols can be mapped to a physical channel, such as an enhanced dedicated physical data channel (E-DPDCH). After mapping to a physical channel, the stream can be converted (e.g., via digital-to-analog conversion) and modulated onto a radio-frequency carrier wave.

Figure 2:
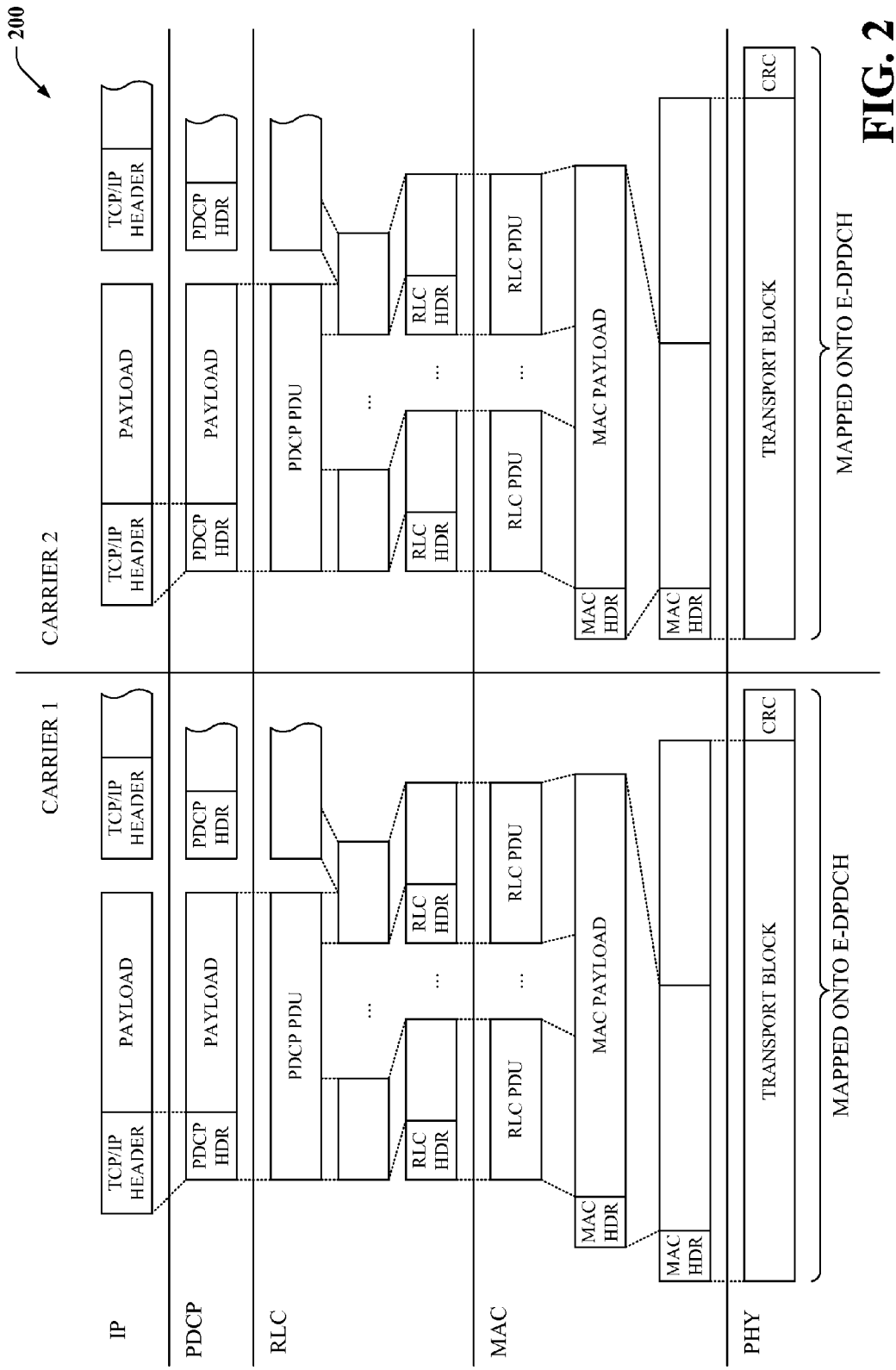
FIG. 2 is an illustration of an example data flow for data to be transmitted on an uplink in accordance with various aspects.

Turning briefly to FIG. 2, an example data flow 200 for data to be transmitted on an uplink is depicted in accordance with various aspects. In data flow 200, an Internet Protocol (IP) service is depicted. An application generates one or more IP packets at an application or IP layer of data flow 200. The IP packets include a TCP/IP header and a payload of application data. The IP packets are passed to a packet data convergence protocol (PDCP) layer. The PDCP layer can perform header compression on IP packets to generate a PDCP header of reduced size relative to the TCP/IP header. The PDCP header and payload comprise a PDCP protocol data unit (PDU) which can be forwarded to a radio link control (RLC) protocol layer. The RLC layer segments the PDCP PDUs into smaller portions wherein the smaller portions can include information from more than one PDCP PDU. A RLC header can be attached to each segment to generate RLC PDUs which are passed to a MAC layer of data flow 200. The MAC layer can concatenate one or more RLC PDUs into a MAC payload, to which a MAC header is attached. The MAC layer can further insert one or more MAC payloads with headers into a transport block. The transport block is forwarded to a physical layer. The physical layer attaches a CRC and maps the transport block with CRC to an E-DPDCH.

While data flow 200 depicts separate data flows for each of carrier 1 and carrier 2, it is to be appreciated that a common data flow can be implemented up to and through the MAC layer. For instance, IP packets can be compressed, segmented, and inserted into a series of MAC payloads. Subsequently, the MAC payloads can be allocated to transport blocks of either carrier 1 or carrier 2 prior to mapping onto a physical channel.

Referring back to FIG. 1, base station 120 can include a physical layer module 124 and a MAC module 122. The physical layer module 124 implements reception of the radio-frequency carrier wave, conversion (e.g., via analog-to-digital conversion), demodulation, demultiplexing, decoding, and the like, to recover the transport block transmitted by UE 110. The MAC module 122 can implement hybrid ARQ handling on the transport block provided by the physical layer module 124. In addition, the MAC module 122 can demultiplex the transport block into one or more data flows. The data flows can be forwarded to upper layers (e.g., RLC) either in base station 120 or RNC 130. The RNC 130 can include a MAC module 132, which can perform similar MAC functionality as MAC module 122 of base station 120. In one aspect, MAC functionality is implemented by the MAC module 132 for non-enhanced uplink transmissions. For enhanced uplink transmissions, the MAC module 132 can implement reordering to facilitate in-sequence delivery of data blocks.

According to an aspect, enhanced uplink or HSUPA transmissions of UE 110 are scheduled by a scheduler (not shown) of base station 120. The scheduler can determine when and at what data rate UE 110 can transmit on the uplink. In a single carrier configuration, for example, UE 110 can generate an uplink resource request or scheduling request. The scheduling request can inform the scheduler how high a data rate UE 110 would like to utilize. The maximum data rate supportable by UE 110 can be expressed as a power ratio between E-DPDCH transmit power and DPCCH transmit power. In an aspect, the scheduling request can be determined by the MAC module 112 of UE 110.

The scheduler of base station 120 can determine a scheduling grant for UE 110 based upon the scheduling grant, channel conditions, and/or other information. The scheduling grant indicates a maximum power ratio (e.g., E-DPDCH-to-DPCCH power ratio or transmit-to-pilot ratio (T2P)) that UE 110 can employ for transmissions. The scheduling grant can be signaled to UE 110 as an absolute scheduling grant via an E-DCH Absolute Grant Channel (E-AGCH) or a relative scheduling grant via an E-DCH Relative Grant Channel (E-RGCH). Absolute scheduling grants typically convey absolute changes and can be employed to assign a high data rate for an upcoming packet transmission. Relative grants convey relative changes during ongoing packet transmissions.

UE 110 maintains a serving grant variable which tracks the maximum T2P available to UE 110 for high speed packet transmissions on E-DCH. UE 110 updates the serving grant variable when an absolute grant or a relative grant is received. The MAC module 112 can determine a data rate to employ for an uplink transmission within the constraints of the serving grant variable and total available power. In one example, the MAC module 112 determines the data rate through E-DCH Transport Format Combination (E-TFC) selection (e.g., transmit packet format selection). Each E-TFC available to UE 110 is associated with a power requirement (e.g., a required T2P ratio to apply a given E-TFC). The UE 110 can evaluate each E-TFC requirement relative to the total available power to identify which E-TFCs can be supported (e.g., the total available power is sufficient to meet the E-TFC requirement) and which E-TFCs are blocked (e.g., the total available power is insufficient to meet the E-TFC requirement). The UE 110 can select an E-TFC from a set of supported E-TFCs which maximizes an amount of data that can be transmitted without exceeding the serving grant.

According to an aspect, UE 110 can be configured to utilize two or more carriers, such as carriers 140 and 150, for uplink transmissions. In one example, the scheduler of base station 120 can operate jointly across carriers. According to this example, UE 110 can transmit a joint or total scheduling request to base station 120. The scheduler can send a total grant across carriers or send a grant respective to each carrier. In another example, the scheduler can operate independently on each carrier and/or separate schedulers can be implemented in base station 120 for each carrier. Pursuant to the example of independent schedulers, UE 110 can transmit separate scheduling requests per carrier. To determine the separate requests, UE 110 can estimate a total available power for enhanced uplink transmissions across all carriers and split or allocate a portion of the total available power to each carrier.

UE 110 can maintain independent serving grant variables for each carrier UE 110 is configured to employ. In addition, for each carrier configured, UE 110 selects an E-TFC to utilize for an uplink transmission on the carrier. In an aspect, UE 110 and, specifically, MAC module 112 selects E-TFCs on each carrier in a joint manner subject to a common total available power. As hybrid ARQ is configured on each carrier, UE 110 may not be transmitting new packets on each carrier at a given transmission time interval (TTI). In one example, a retransmission can be required on one or more carriers. In the case of two carriers (e.g., carriers 140 and 150), three situations are possible for a given TTI: two retransmissions, one retransmission and one new transmission, and two new transmissions. In the case of two retransmissions, E-TFC selection need not be done as previous packet formats and power allocations can be utilized again for the retransmissions. In the case of one retransmission and one new transmission, E-TFC selection as described supra with respect to a single carrier can be performed for the new transmissions. In this example, the total available power for the new transmission is the total available power for enhanced uplink transmissions minus the power required for the retransmission. For two new transmissions, UE 110 determines how much power from the total available power for enhanced uplink transmissions is to be allocated to each carrier. The power allocated to each carrier in turn influences the E-TFC selected for each carrier.

In one aspect, UE 110 can implement a water-filling or complete optimization power split scheme. According to this optimization, constraints include a maximum allowed UE transmit power and serving grants for both carriers. In one example, identifying an optimal power distribution solution can be effectuate by a brute-force search. In another example, an approximation can be determined.

According to an aspect, $T2P_m$ is the T2P of an E-TFC selected on carrier m. An optimal E-TFC selection can be a result of the following optimization, which is to find $T2P_m$ for each carrier m such that $\Sigma_m R(T2P_m)$ is maximized subject to the following constraints:

$$T2P_m \leq 0$$

$$T2P_m \leq SG_m$$

$$\Sigma_m (P_{DPCCH,target,m} + P_{DPCCH,target,m} * T2P_m + P_{DPDCH,m} + P_{HS-DPCCH,m} + P_{E-DPCCH,m}) \leq P_{max}$$

Pursuant to this example, $R(T2P_m)$ is a date rate associated with $T2P_m$, which can be computed based upon a configured interpolation or extrapolation after a hybrid ARQ target is considered. $SG_m$ is a serving grant on carrier m. $P_{max}$ represents a maximum allowed transmit power of UE 110. $P_{DPCCH,target,m}$ is based upon a 3-slot filtered DPCCH power and compressed mode status. $P_{DPDCH,m}$ represents an estimated DPDCH transmit power. In an example, $P_{DPDCH,m}$ can be estimated based upon $P_{DPDCH,target,m}$ and gain factors from TFC selection already made (e.g., prior to E-TFC selection). $P_{HS-DPCCH,m}$ is an estimated HS-DPCCH transmit power based upon a maximum HS-DPCCH gain factor, $P_{DPCM,target,m}$, most recent signaled values of ACK, NACK, and CQI. $P_{E-DPCCH,m}$ is an estimated E-DPCCH transmit power including E-DPCCH boosting.

Denoting a first and second derivative of R(T2P), with respect to T2P, as R'(T2P) and R"(T2P), respectively. R'(T2P) and R"(T2P) can be found from the slope of R(T2P) via interpolation/extrapolation. For instance, the slope of R(T2P) can be approximated from signaled reference points known to UE 110. In an example, R(T2P) can be concave such that R'(T2P)>0 and R"(T2P)≤0. The concavity implies that optimal T2P can be identified for each carrier according to the following. Carriers are sorted such that $P_{DPCM,target,1} \leq P_{DPCCH,target,2}$, for a two carrier example. Next, $T2P_1$ is determined to be as high as possible, wherein $T2P_1$ is limited by either $SG_1$ or $P_{max}$. A first value represented by $R'(T2P_1)/P_{DPCCH,target,1}$ is evaluated to determine if the first value is greater than or equal to a second value denoted by $R'(0)/P_{DPCCH,target,2}$. If the first value is greater than or equal to the second value, the optimization is complete. Otherwise, the optimization can continue. If the optimization continues, $T2P_1$ and $T2P_2$ are identified such that $R'(T2P_1) P_{DPCCH,target,1}$ equals $R'(T2P_2) P_{DPCCH,target,2}$. In accordance with an aspect, the equality can be established through a search wherein $T2P_1$ is allocated to the point where $R'(T2P_1)/P_{DPCCH,target,1} \leq R'(0)/P_{DPCCH,target,2}$. $T2P_1$ and $T2P_2$ can be alternately increased until the equality is achieved. Although the optimization example described above is illustrated in terms of two carriers, it is to be appreciated that the optimization can be extended to more than two carriers and the claims appended hereto are intended to cover situations wherein the number of carriers exceeds two.

While UE 110 retains sufficient information to conduct the optimal search detailed above, an approximation of the optimum can be employed to reduce complexity in accordance with another aspect. In an aspect, the complexity of the optimal solution is due to the concavity of R(T2P). The concavity can be significant when received signal-to-interference-and-noise ratio (SINR) is high. In the uplink of CDMA systems, the received SINR is typically low to medium due to intra-cell and inter-cell interference. Accordingly, R(T2P) can be assumed to be linear. As a consequence, $R'(T2P_1)/P_{DPCCH,target,1} \geq R'(T2P_2)/P_{DPCCH,target,2}$ can be true for most combinations of $T2P_1$ and $T2P_2$. In view of this, a greedy-filling procedure can be employed as a close approximation to the optimal solution. In accordance with an aspect, the carriers can be sorted such that $P_{DPCCH,target,1} \leq P_{DPCCH,target,2}$. $T2P_1$ can be made as large as possible given that $T2P_1$ is limited by $SG_1$ and $P_{max}$. A remaining power is determined after $T2P_1$ is identified for carrier 1. $T2P_2$ is identified such that it is the maximum allowed in view of the remaining power and $SG_2$. In one example, this greedy filling scheme can optimize an instantaneous data rate of UE 110.

In accordance with another aspect, UE 110 can implement an equal split power distribution scheme. For instance, UE 110 can split total available power equally across all carriers. For example, UE 110 can apportion equal shares of the total available power for E-DCH transmission to carrier 140 and carrier 150. In the power distribution schemes described above (e.g., water filling scheme, greedy filling scheme, equal split scheme), a total available power is distributed across carriers. According to another aspect, the total available power is derived from the maximum power available to UE 110 for transmission. If DPDCH is configured on one or more carriers, TFC selection occurs for DPDCH transmissions assuming all power from the maximum power available, after any pilot and overhead power on all carriers is deducted, can be used for the DPDCH transmissions. Next, power required for E-DPCCH or HS-DPCCH transmission on all carriers is determined and deducted from the total power. Accordingly, the total available power utilized in the above described distribution schemes (e.g., the power available for E-DCH transmissions) can be all leftover power from the maximum power available to UE 110 after allocation to DPDCH, DPCCH, and HS-DPCCH.

As further illustrated in system 100, UE 110 can include a processor 116 and/or a memory 118, which can be utilized to implement some or all of the functionality of MAC module 112 and physical layer module 114. Similarly, FIG. 1 illustrates that base station 120 can also include a processor 126 and/or a memory 128, which can be employed to implement some or all of the functionality of MAC module 122 and physical layer module 124 and RNC 130 can include a processor 134 and/or a memory 136 to implement MAC module 132.

As described above, total power available for enhanced uplink transmissions is split or distributed across carriers when two or more component carriers are configured on the uplink. The power distribution can be determined in accordance with a variety of schemes. For instance, the power distribution can conform to an equal split scheme. In another example, the power distribution conforms with a greedy-filling or water-filling scheme. In an aspect, the power allocated to the carriers is determined in a joint manner such that all the carriers are evaluated to determine the power distribution. In evaluating all the carriers, performance and differences between carriers can be considered. While the above power distribution schemes have been described in connection with WCDMA/HSPA, it is to be appreciated that 3GPP, 3GPP LTE, 3GPP LTE-A, UMTS, CDMA, WiMAX, WiFi, and/or other technologies can utilize the concepts presented herein to distribute power resources among a plurality of carriers.

Figure 3:
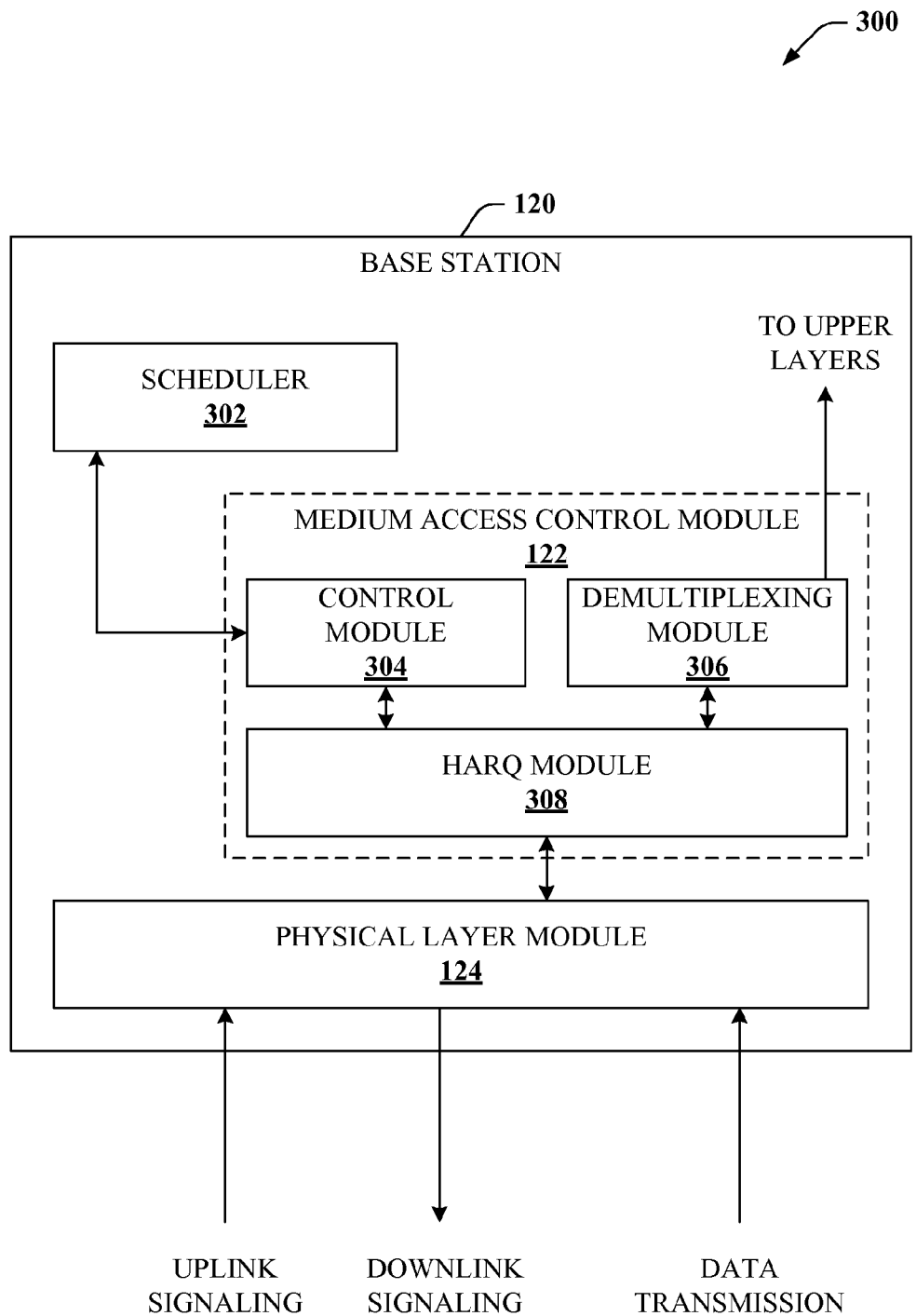
FIG. 3 is an illustration of an example system that facilitates receiving and scheduling enhanced uplink transmissions according to various aspects.

Referring next to FIG. 3, a system 300 is illustrated that facilitates receiving and scheduling enhanced uplink transmissions according to various aspects. System 300 can include a base station 120, which can be similar to and perform similar functionality as base station 120 described above with respect to FIG. 1. Base station 120 can receive uplink signaling and uplink data transmissions from one or more mobile devices, such as UE 110. In addition, base station can transmit downlink signaling to one or more mobile devices.

Base station 120 can include a physical layer module 124 that facilitates reception and transmission of uplink signaling, downlink signaling, and data transmissions. For instance, the physical layer module 124 can receive a radio-frequency carrier wave from a mobile device, perform an analog-to-digital conversion, demodulate and decode to recover a transport block which can be forwarded to a MAC module 122 of base station 120. In addition, the physical layer module 124 can encode, modulate, and transmit downlink signaling (e.g., scheduling grants) to one or more mobile devices. In one example, uplink signaling can include scheduling information (e.g., buffer reports, power headroom reports, scheduling requests, happy bit, etc.) as well as indicators of E-TFCs employed for uplink data transmissions. Downlink signaling can include scheduling grants, hybrid ARQ indicators (e.g., ACK/NACK), and the like. Data transmissions can include uplink data transmissions including E-DCH transmissions on one or more carriers.

The MAC module 122 of base station 120 can facilitate HARQ retransmissions, scheduling, and demultiplexing. The MAC module 122 can include a HARQ module 308 which can support one or more instances (e.g., HARQ processes) of stop and wait HARQ protocols. Each HARQ process managed by the HARQ module 308 can generate ACKs or NACKs indicating a delivery status of E-DCH transmissions. The MAC module 122 can also include a demultiplexing module 306 that demultiplexes transport blocks into one or more segments or MAC PDUs which are forwards to upper layers (e.g., to associated data flows such as MAC-d or QoS flows).

In accordance with an aspect, the MAC module 122 can include a control module 304 which can facilitate reception of scheduling requests from one or more mobile devices and transmission of scheduling grants to one or more mobile devices. The control module 304 can be associated with a scheduler 302 which determines scheduling grants based at least in part on scheduling requests. In an aspect, scheduler 302 determines when and at what data rate a mobile device is allowed to transmit on an uplink in order to control an amount of interference affecting other mobile devices associated with base station 120. In another aspect, scheduler 302 can employ channel-dependent scheduling.

The scheduler 302 can employ a variety of scheduling mechanisms to generate scheduling grants. For instance, scheduler 302 can utilize round-robin scheduling. In another example, scheduler 302 can implement a maximum fairness policy wherein each mobile device served by base station 120 is assigned the same data rate. In addition, scheduler 302 can employ a greedy-filling strategy such that the mobile device with the best radio conditions is assigned as high data rate as possible. The mobile device with the second best channel conditions can receive a scheduling grant if the interference level at base station 120 is within a tolerable limit after scheduling the mobile device with the best conditions and so on.

In accordance with an aspect, base station 120 can be configured to support multiple uplink carriers for high speed uplink packet access. For example, base station 120 can serve a mobile device configured to transmit data with a plurality of component carriers. Scheduler 302 can employ joint scheduling for the carriers utilized by the mobile device. In another example, scheduler 302 can independently schedule each carrier utilized by the mobile device. Pursuant to this example, the base station 120 can receive uplink signaling (e.g., scheduling requests) on each carrier. The scheduling requests on each carrier can be separately received and evaluated by the control module 304. Scheduler 302 can independently determine a scheduling grant for the mobile device on each carrier based at least in part on respective scheduling requests. The control module 304 can facilitate transmission of the respective scheduling grants on each carrier to the mobile device.

Figure 4:
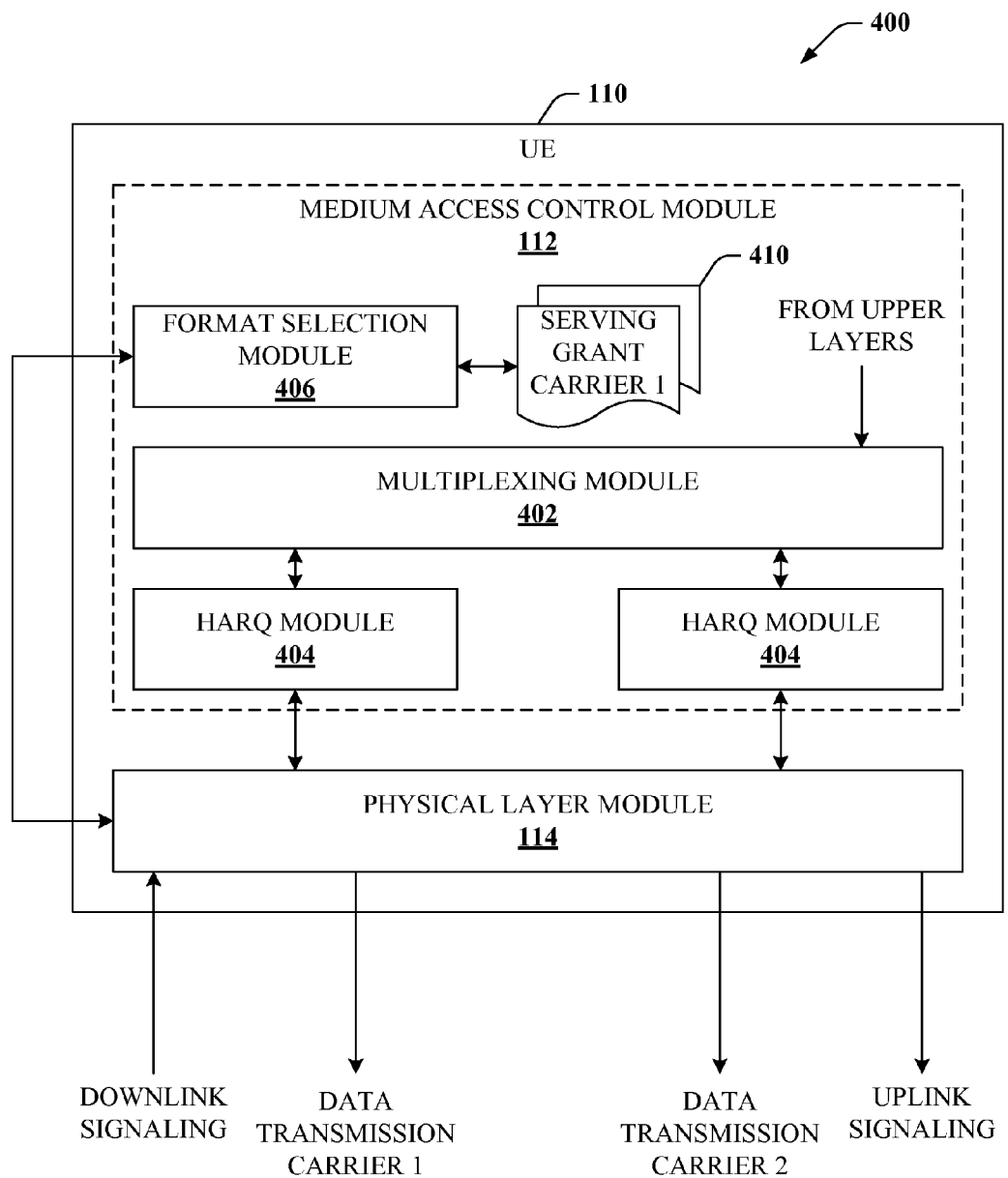
FIG. 4 is an illustration of an example system that facilitates transmitting high speed uplink data on a plurality of carriers in accordance with various aspects.

Turning now to FIG. 4, a system 400 is depicted that facilitates transmitting high speed uplink data on a plurality of carriers in accordance with various aspects. System 400 can include a UE 110, which can be similar to and perform similar functionality as UE 110 described above with respect to FIG. 1. UE 110 can receive downlink signaling from a base station, such as base station 120. In addition, UE 110 can transmit uplink signaling and uplink data transmissions to the base station.

In one aspect, UE 110 can be configured to utilize multiple component carriers for enhanced uplink or HSUPA transmissions. Each component carrier, in a carrier aggregation configuration, can include full enhanced uplink capabilities. Accordingly, downlink signaling, uplink signaling, and uplink data transmissions can be received and transmitted separately on each component carrier. Downlink signaling can include, for example, absolute and relative scheduling grants for each carrier configured. Uplink signaling can include scheduling requests for each carrier, E-TFC selections for each carrier, power headroom, buffer status reports, and the like.

In an example, UE 110 can be configured to employ two carriers (e.g., carriers 1 and 2). UE 110 can include a MAC module 112 which can perform packet format selection, and multiplexing of one or more flows (e.g., RLC PDUs on the logical channels) into a selected packet format. The MAC module 112 can receive a plurality of RLC PDUs from one or more data flows (e.g., MAC-d flows). The plurality of RLC PDUs can be associated with applications utilizing IP services and include portions of TCP/IP packets generated by the applications. The MAC module 112 can process RLC PDUs to generate MAC-d PDUs. The MAC module 112 can include a multiplexing module 402 which can multiplex one or more MAC-d PDUs into one or more MAC-e PDUs which are in turn packaged into a MAC-es PDU or transport block. The multiplexing module 402 packages PDUs into the transport block in accordance with a packet format or E-TFC chosen by a format selection module 408. In an aspect, a transport block is transmitted by the physical layer module 114 for each carrier configured. Accordingly, the format selection module 408, for a given TTI, can select one or more E-TFCs, up to one for each carrier, depending on HARQ status of respective E-DCH transmissions. In the example of two configured carriers, each with a new transmission for a TTI, the format selection module 408 selects two E-TFCs, one per carrier. The multiplexing module 402 can determine which E-TFC data from a particular data flow should be allocated. Accordingly, the multiplexing module 402 can jointly multiplex and package transport blocks across all carriers.

The MAC module 112 can further include one or more HARQ modules 404. In an aspect, an independent HARQ module 404 can be associated with each configured carrier. The HARQ module 404 implements MAC functionality related to a HARQ protocol. For respective carrier associated with a particular HARQ module 404, the particular HARQ module 404 can retain transport blocks for retransmission. The HARQ modules 404 can be configured by radio resource control (RRC) and provides transport blocks to the physical layer module 114 for transmission on respective component carriers.

As discussed supra, the multiplexing module 402 of the MAC module 112 packages PDUs from various data flows into transport blocks in accordance with packet formats or E-TFCs selected on each carrier. In an aspect, the E-TFCs are identified by the format selection module 406 based at least in part on scheduling grants received form a base station via downlink signaling. Scheduling grants can be absolute scheduling grants received on E-AGCH or relative grants received on E-RGCH. For each scheduling grant received, MAC module 112 updates serving grants 410, wherein individual serving grants are maintained per configured carrier. The serving grants 410 indicate to UE 110 a maximum data rate or transmit-to-pilot (T2P) power ratio is allowed to employ for transmissions on respective carriers. MAC module 112 updates the serving grants 410 when an absolute and/or relative scheduling grant is received through downlink signaling on one or more carriers. For example, an absolute grant can be received on E-AGCH of a first carrier. The MAC module 112 updates the serving grant 410 associated with the first carrier to be equivalent to the absolute grant. In another example, a relative grant can be received on E-RGCH of a second carrier. The MAC module 112, in response to the relative grant, can increment or decrement the serving grant 410 associated with the second carrier by an amount equivalent to the relative grant, depending on whether the relative grant is an increase or decrease in the maximum allowed data rate.

In another aspect, the E-TFCs are selected in accordance with a total power available for E-DCH transmissions for all carriers. The total power available can be derived from a maximum transmit power available to UE 110 for all transmissions including control signaling. For example, dedicated channel (DCH) transmissions (e.g., non-HSPA transmissions), and associated control signaling, can be given priority such that power required to serve DCH transmissions is allocated first. Thus, the power consumed for DCH transmission is deducted from the maximum transmit power of UE 110. In addition, power required for E-DPCCH transmissions (e.g., control signaling associated with E-DCH transmissions) can be deducted as well to derive the total power available for E-DCH transmissions.

In an example single-carrier scenario, the format selection module 406 identifies an E-TFC based upon the serving grant 410 and the total power available. Pursuant to this example, the format selection module 406 can categorize configured E-TFCs based upon the total power available. For instance, the format selection module 406 can compare a power requirement of each E-TFC to the total power available. E-TFCs associated with a power requirement greater than the total power available can be categorized as blocked and E-TFCs associated with a power requirement less than or equal to the total power available can be classified as supported. After categorization, the format selection module 406 can select an E-TFC that is supported and allows as high data rate as possible within the constraint of the serving grant 410.

In an example dual-carrier scenario as depicted in FIG. 4, the format selection module 406 select E-TFCs for both carriers (e.g., carriers 1 and 2) in a joint manner. The total power available is distributed among both carriers, accordingly, the format selection module 406 selects E-TFCs for both carriers based upon an amount of power allocated to each carrier and the serving grants 410 of respective carriers. To derive the respective amount of power allocated to each carrier, the format selection module 406 can employ one of a variety of power split mechanisms or power distribution schemes.

In an aspect, the format selection module 406 can equally split the total available power among carriers. For instance, the format selection module 406 can allocate half the total available power to each of carriers 1 and 2. In accordance with another aspect, the format selection module 406 can implement an optimal power split solution (e.g., a water filling scheme). As described supra, the water-filling scheme maximizes a total data rate across all carriers given the power allocated to each carrier. In another aspect, the format selection module 406 can employ a greedy-filling algorithm, which can be a close approximation to the optimal power split solution. Under the greedy-filling scheme, the format selection module 406 evaluates a pilot power on each carrier. In one example, a high transmit pilot power indicates poor channel conditions. After evaluation of the pilot power on each carrier, the carriers can be ranked form lowest pilot power to highest pilot power. The carrier with the lowest pilot power can have better channel quality. The format selection module 406 can distribute power in accordance with the ranking of the carriers. For instance, the format selection module 406 can allocate as much power as possible to the carrier with the lowest pilot power, within the constraints of the serving grant 410 and the total available power. Any power remaining after allocation to the carrier with the lowest pilot power can be distributed to the carrier with the second lowest pilot power. Power can continue to be distributed iteratively in this manner until all carriers are served or the total available power is exhausted.

After an amount of power on each carrier is determined, the format selection module 406 can identify E-TFCs supported on each carrier based upon the amount of power on each carrier. For each carrier, the format selection module 406 can select an E-TFC, from the set of supported E-TFCS, which does not exceed the serving grant 410. The selected E-TFCs can be employed by the multiplexing module 402 to concatenate PDUs to generate transport blocks transmitted by the physical layer module 114 on each carrier.

Figure 5:
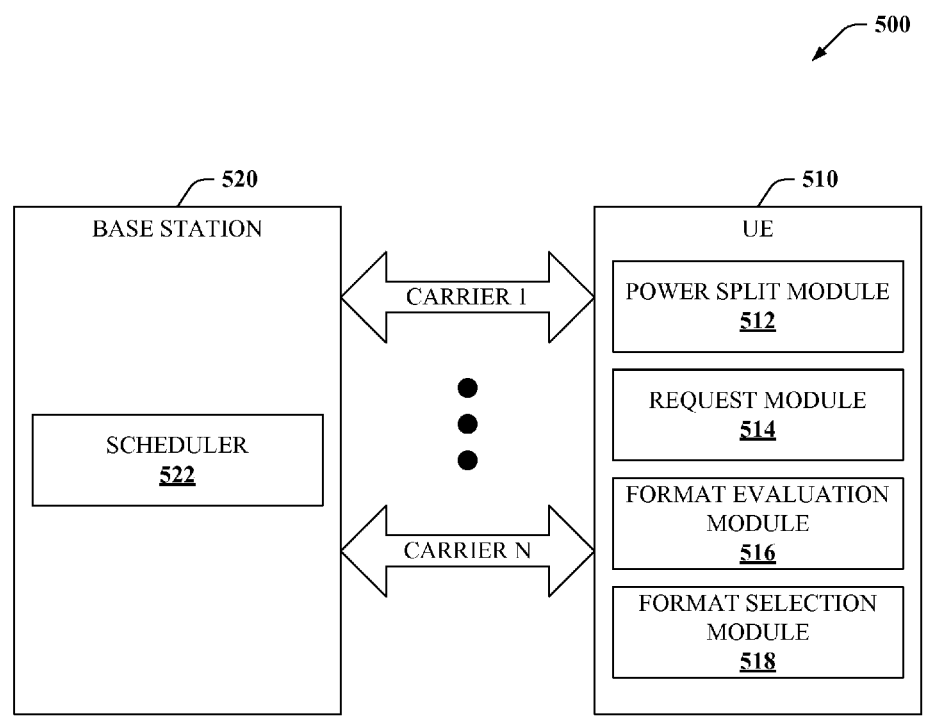
FIG. 5 is an illustration of an example system that facilitates power distribution and packet format selection for a multi-carrier uplink configuration in accordance with various aspects.

FIG. 5 illustrates a wireless communication system 500 that facilitates power distribution and packet format selection for a multi-carrier uplink configuration in accordance with various aspects. As FIG. 5 illustrates, system 500 can include a UE 510, which can communicate with a base station 520. In an aspect, UE 510 can be configured to utilize a plurality of carriers to transmit information on the uplink. For instance, UE 510 can employ carriers 1 through carrier N, where N is an integer greater than or equal to two. Each carrier, 1 through N, can include a set of downlink channels and a set of uplink channels. Accordingly, in one example, each carrier can operate as a complete wireless communication system.

In one example, UE 510 receives scheduling grants (e.g., absolute and/or relative scheduling grants) on each carrier. The scheduling grants indicate a maximum T2P power ratio UE 510 can employ for an enhanced uplink or HSUPA transmission on E-DCH, and consequently, the data rate. UE 510 utilizes the scheduling grants to update serving grant variables maintained internally. In an aspect, UE 510 maintains individual serving grant variables for each carrier 1 through N.

To facilitate scheduling (e.g., determination of scheduling grants), UE 510 can transmit a scheduling request to base station 520. UE 510 can transmit a separate request on each carrier UE 510 desires to employ for a given TTI. To determine the requests, the UE 510 can allocate a portion of power to each carrier, wherein UE 510 is constrained by a total available power which can be derived from a maximum power of UE 510 and power required by non-HSUPA and/or control signaling transmissions. UE 510 can employ a power split module 512 to distribute power among the carriers. The power split module 512 can utilize a variety of distribution schemes or split mechanisms. As discussed herein, the power split module 512 can utilize an equal split scheme, a water-filling scheme, a greedy-filling scheme, and/or a combination or compromise scheme. For instance, the power split module 512 can utilize a compromise between the equal split scheme and the greedy-filling scheme such as, for example, a proportional scheme which facilitates allocating power to each carrier in proportion to respective serving grants.

After a power distribution is determined, UE 510 can utilize a request module 514 to generate a set of scheduling requests. In one example, a scheduling request can be generated for each carrier UE 510 is configured to utilize. The request module 514 can determine a scheduling request for a particular carrier in accordance with the power provisionally allocated to the carrier by the power split module 512.

The set of scheduling requests can be transmitted to the base station 520, which includes a scheduler 522. The scheduler 522 determines scheduling grants based at least in part on scheduling requests. In an aspect, scheduler 522 determines when and at what data rate UE 510 is allowed to transmit on an uplink in order to control an amount of interference affecting other UEs (not shown) associated with base station 520. The scheduler 522 can determine absolute and/or relative scheduling grants for UE 510 and can determine the grants in a joint manner across carriers, or individually for each carrier. The scheduling grants are transmitted to UE 510 via downlink signaling. In one aspect, separate scheduling grants are transmitted on each carrier configured.

UE 510 maintains serving grant variables which are updated with the received scheduling grants. The serving grants facilitate selection of a transport block format or E-TFC. In an aspect, E-TFC selection is performed in a joint manner across carriers such that both carriers are evaluated together to determine packet formats. UE 510 can utilize the power split module 512 to implement splitting the total available power across carriers in accordance with the serving grants. As described supra, the power split module 512 can employ various power distribution schemes. After power splitting, UE 510 can utilize a format evaluation module 516 to categorize E-TFCs in a set of E-TFCs as supported or blocked. The format evaluation module 516 can classify E-TFCs on each carrier as support or blocked based at least in part on an amount of power distributed to each carrier. UE 510 includes a format selection module 518 that facilitate selection of a transport block format or E-TFC from the set of E-TFCs for each carrier. In one example, for a given carrier, the format selection module 518 can choose an E-TFC from the subset of E-TFCs classified as supported for the carrier, wherein the chosen E-TFC does not violate the serving grant constraint.

Referring to FIGS. 6-9, methodologies related to facilitating E-TFC selection for multi-carrier uplink transmissions are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 6:
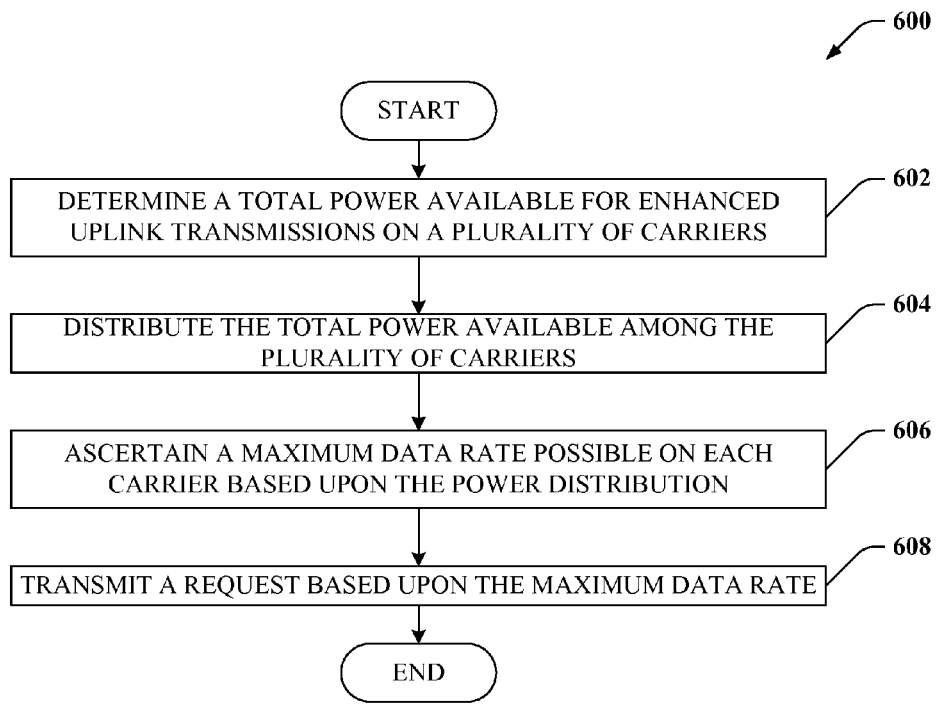
FIG. 6 is an illustration of an example methodology for determining a scheduling request for a multi-carrier communication system.

Turning to FIG. 6, illustrated is a method 600 for determining a scheduling request for a multi-carrier communication system. Method 600 can be employed, for example, by a mobile device to facilitate signaling scheduling requests. At reference numeral 602, a mobile device configured to utilize multiple carriers for transmissions can determine a total power available for any enhanced uplink transmissions on a plurality of carriers. At reference numeral 604, the total power available can be distributed among the plurality of carriers. In one example, an equal split scheme can be utilized such that each carrier in the plurality of carriers receives an equal share of the total available power. In another example, an optimal power split can be derived through utilization of a water-filling approach to power distribution. In yet another example, a greedy-filling approach can be employed, wherein a strongest carrier is allocated as much power as possible within constraints of an associated serving grant.

At reference numeral 606, a maximum data rate possible on each carrier is determined based at least in part on the power distribution. For instance, an amount of power allocated to a particular carrier can be identified based upon the power distribution. The amount of power allocated to the carrier can support up to a particular maximum data rate. At reference numeral 608, a scheduling request can be transmitted based upon the maximum data rate. In an aspect, a scheduling request is transmitted on each carrier from the plurality of carriers, wherein each scheduling request is based upon respective maximum data rates associated with each carrier. In another aspect, an aggregate scheduling request can be transmitted.

Figure 7:
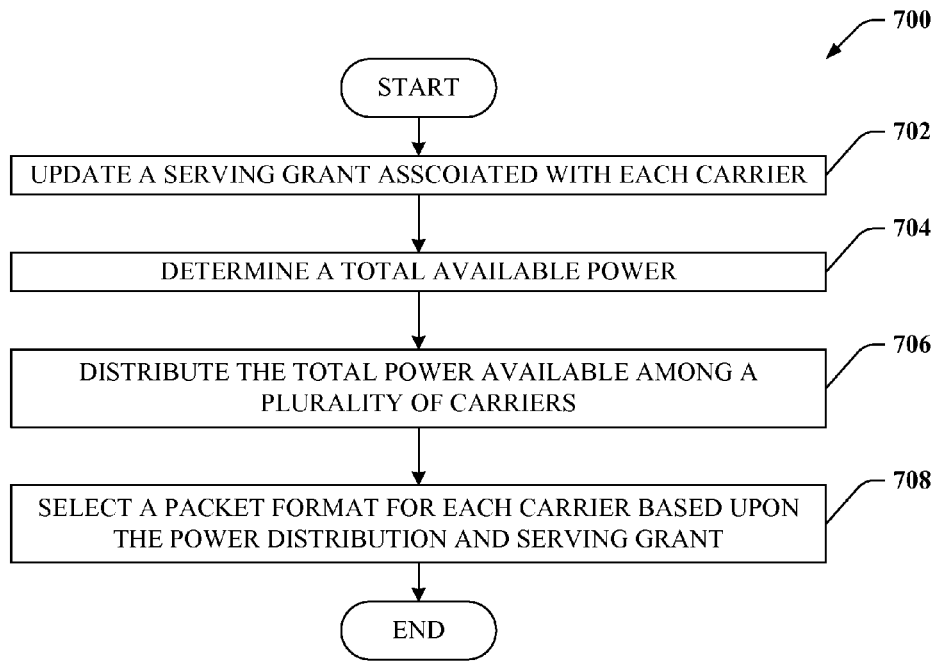
FIG. 7 is an illustration of an example methodology for selecting packet formats for uplink transmissions in a multi-carrier configuration in accordance with various aspects.

Referring now to FIG. 7, a method 700 is depicted that facilitates selecting packet formats for uplink transmissions in a multi-carrier configuration in accordance with various aspects. Method 700 can be employed, for instance, by a mobile device configured to utilize two or more component carriers to transmit HSUPA packet data. Method 700 can commence at reference numeral 702 where serving grants associated with respective carriers can be updated. Updating of the serving grants can be based upon absolute or relative scheduling grants received via downlink signaling on respective carriers. At reference numeral 704, a total available power for enhanced uplink transmission across all carriers can be determined. In an aspect, the total available power can be derived from a maximum transmit power a mobile device is capable of utilizing. For instance, from the maximum power, power required to transmit DCH, DPCCH, and HS-DPCCH can be deducted to result in the total available power.

At reference numeral 704, the total power available can be distributed among the plurality of carriers. In one example, an equal split scheme can be utilized such that each carrier in the plurality of carriers receives an equal share of the total available power. In another example, an optimal power split can be derived through utilization of a water-filling approach to power distribution. In yet another example, a greedy-filling approach can be employed, wherein a strongest carrier is allocated as much power as possible within constraints of an associated serving grant. At reference numeral 708, a packet format can be selected for each carrier based upon the power distribution and serving grant. For instance, from the power allocated to a given carrier, a group of packet formats capable of being transmitted with the power allocated can be identified. From the group, a packet format offering a maximum data rate can be selected provided that the selected packet format does not exceed the serving grant associated with the given carrier.

Figure 8:
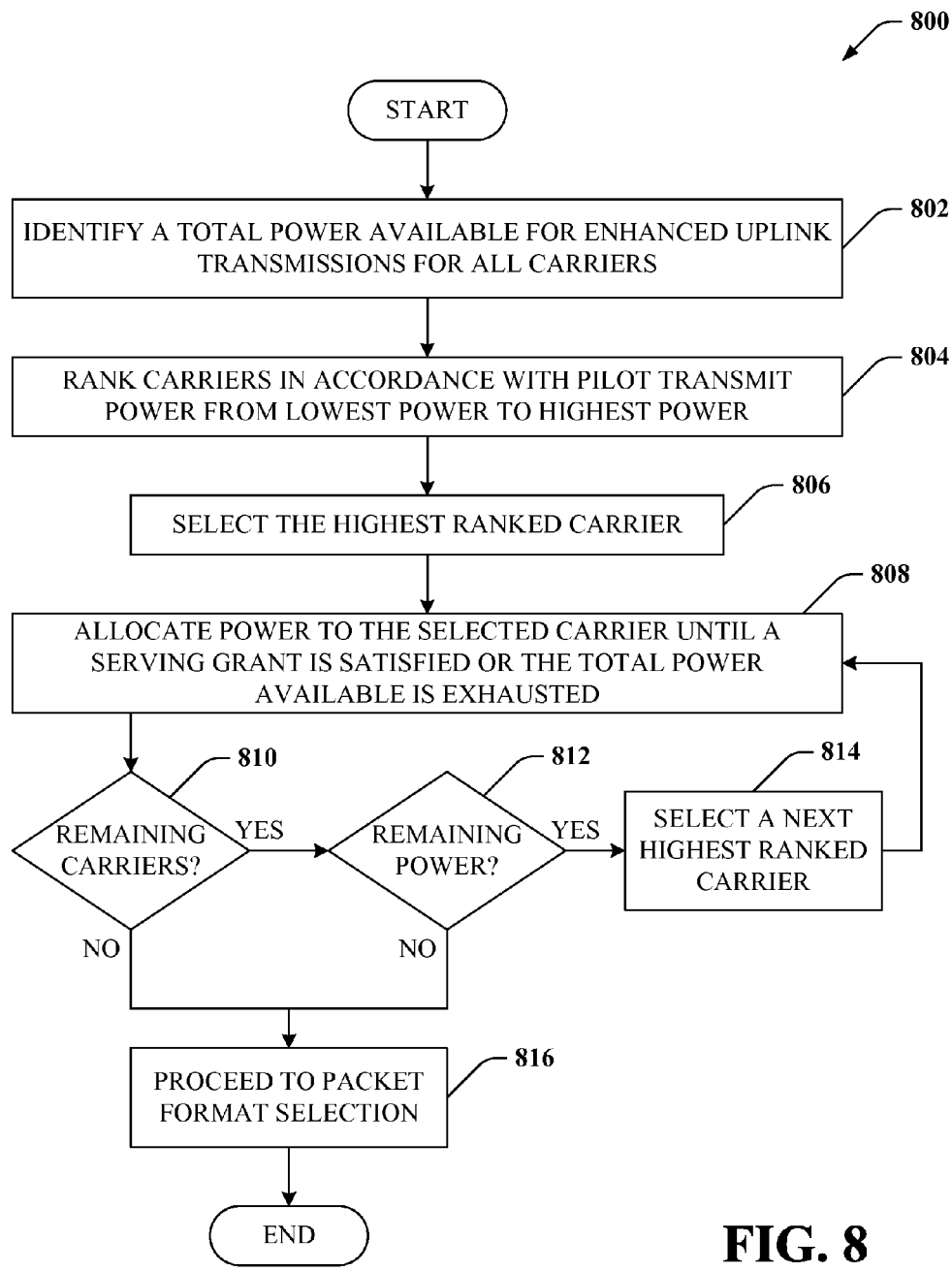
FIG. 8 is an illustration of an example methodology for distributing available power among a plurality of carriers in accordance with various aspects.

Turning now to FIG. 8, illustrated is a method 800 for distributing available power among a plurality of carriers in accordance with various aspects. At reference numeral 802, a total power available for all enhanced uplink transmissions across all carriers is identified. At reference numeral 804, carriers can be ranked in accordance with a pilot transmit power associated with respective carriers. In an aspect, the carriers can be ranked from lowest pilot transmit power to highest pilot transmit power. At reference numeral 806, the highest ranked carrier is selected. At reference numeral 808, power is allocated to the selected carrier until the total available power is exhausted or the serving grant associated with the selected carrier is satisfied. At reference numeral 810, a determination is made as to whether there are carriers remaining to which power is to be allocated. If yes, method 800 proceeds to reference numeral 812 where a determination is made as to whether there is remaining power. If yes, method 800 proceeds to reference numeral 814 where a next highest ranked carrier is selected. Method 800 can proceed back to reference numeral 808 where power is allocated to the selected carrier. If, at reference numeral 810 or 812, it is determined that there are no remaining carrier waiting for power or no power remaining, method 800 can advance to reference numeral 816 where packet format selection can proceed.

Figure 9:
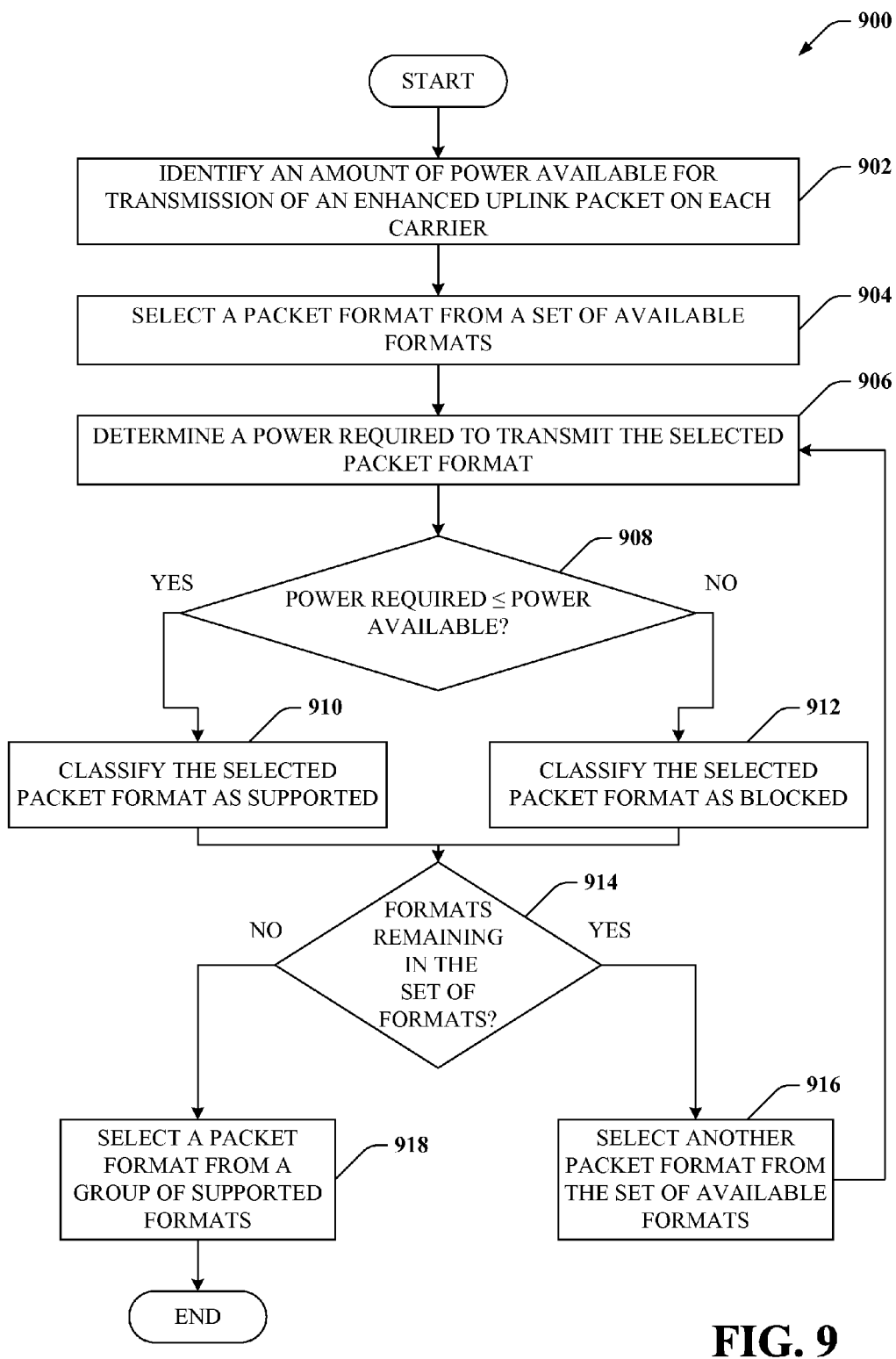
FIG. 9 is an illustration of an example methodology for classifying packet formats in accordance with various aspects.

Referring now to FIG. 9, a method 900 is depicted for classifying packet formats in accordance with various aspects. At reference numeral 902, an amount of power available for transmission of an enhanced uplink packet is identified for a particular carrier configured. At reference numeral 904, a packet format from a set of available formats is selected. At reference numeral 906, a power required to transmit the selected packet format is determined. At reference numeral 908, it is determined if the power required to transmit the selected packet format is less than or equal to the power available for transmission. If yes, method 900 proceeds to reference numeral 910 where the selected packet format is classified as supported. If, at reference numeral 908, it is determined that the power required exceeds the power available, the method 900 proceeds to reference numeral 912 where the selected packet format is classified as blocked. At reference numeral 914, it is determined if any formats in the set of formats remain to be categorized. If yes, the method 900 proceeds to reference numeral 916 where another packet format from the set of available formats is selected and classified. If no, the method 900 advances to reference numeral 918 where a packet format is selected from the group of supported formats.

It will be appreciated that, in accordance with one or more aspects described herein, inferences can be made regarding employing a distribution scheme, allocation power among carriers, determining scheduling requests, selecting packet format, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
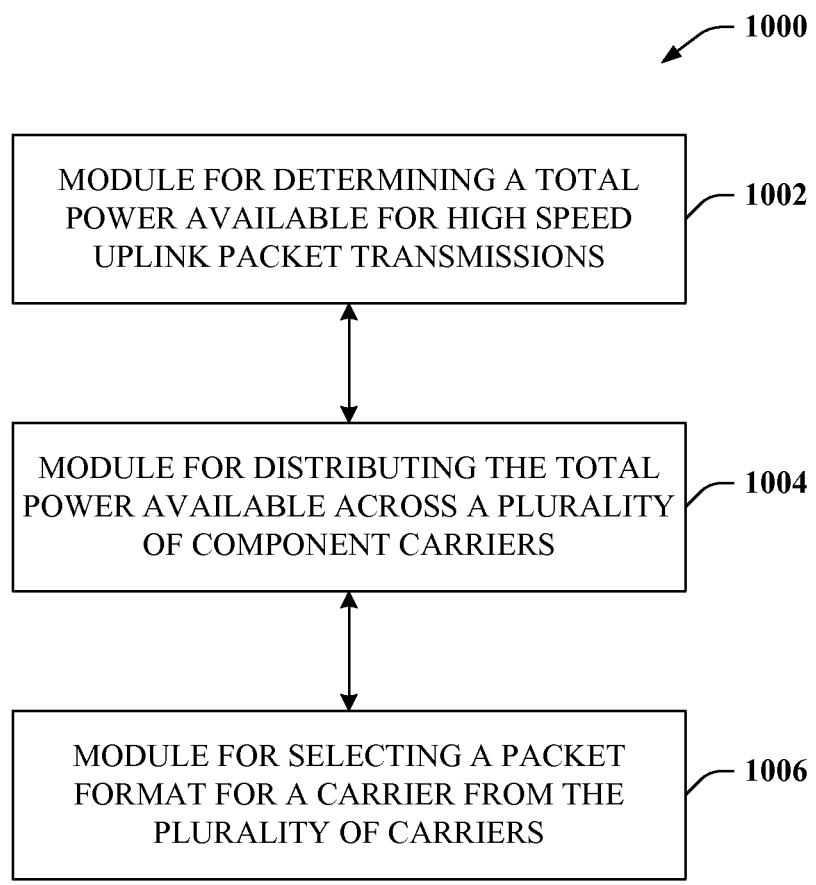
FIG. 10 is an illustration of an example apparatus that facilitates distribution of transmit power among a plurality of component carriers in accordance with various aspects.

Referring next to FIG. 10, an apparatus 1000 that facilitates distribution of transmit power among a plurality of component carriers in a wireless communication system is illustrated. It is to be appreciated that apparatus 1000 is represented as including functional blocks, which can be functional blocks that represent functions implemented by a processor, software, or combination thereof (e.g., firmware). Apparatus 1000 can be implemented by a user device (e.g., UE 110) and/or any other suitable network entity and can include a module 1002 for determining a total power available for high speed uplink transmission across a plurality of carriers, a module 1004 for distributing the total power available across a plurality of component carriers, and a module 1006 for selecting a packet format for a carrier from the plurality of carriers.

Figure 11:
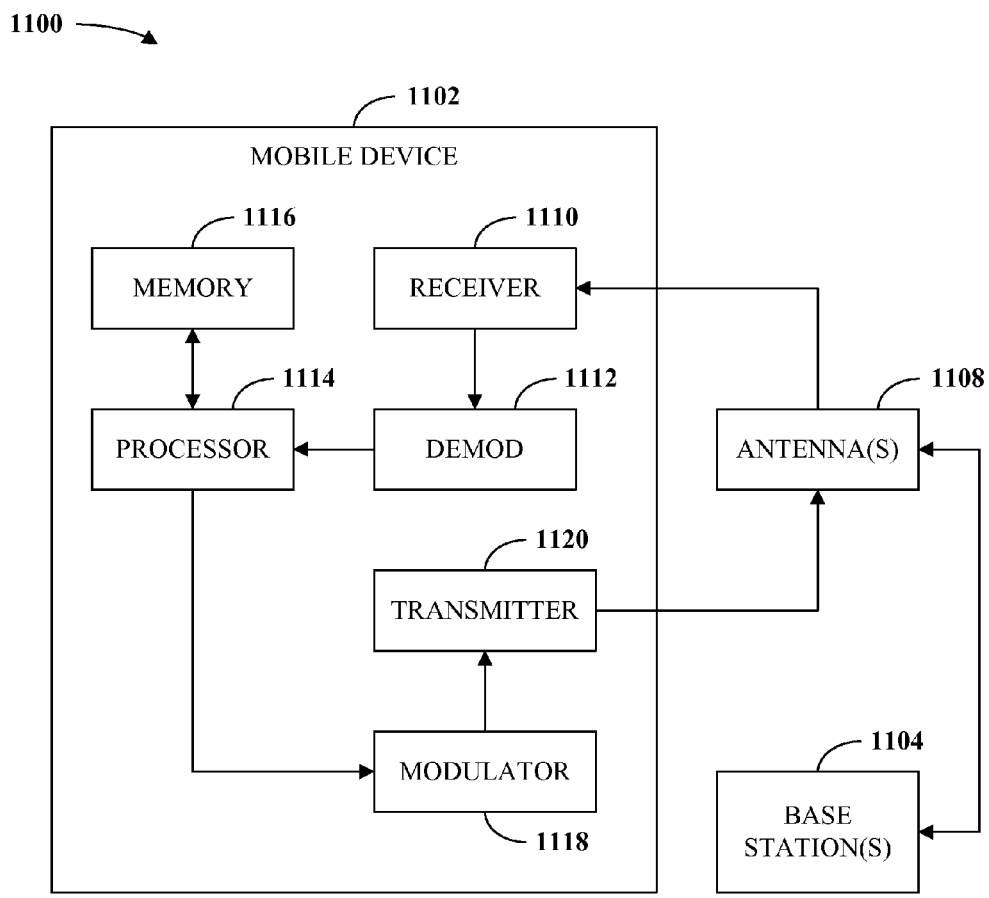
FIGS. 11-12 are block diagrams of respective wireless communication devices that can be utilized to implement various aspects of the functionality described herein.

FIG. 11 is a block diagram of another system 1100 that can be utilized to implement various aspects of the functionality described herein. In one example, system 1100 includes a mobile device 1102. As illustrated, mobile device 1102 can receive signal(s) from one or more base stations 1104 and transmit to the one or more base stations 1104 via one or more antennas 1108. Additionally, mobile device 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile device 1102. Mobile device 1102 can also include a modulator 1118 that can multiplex a signal for transmission by a transmitter 1120 through antenna(s) 1108.

Figure 12:
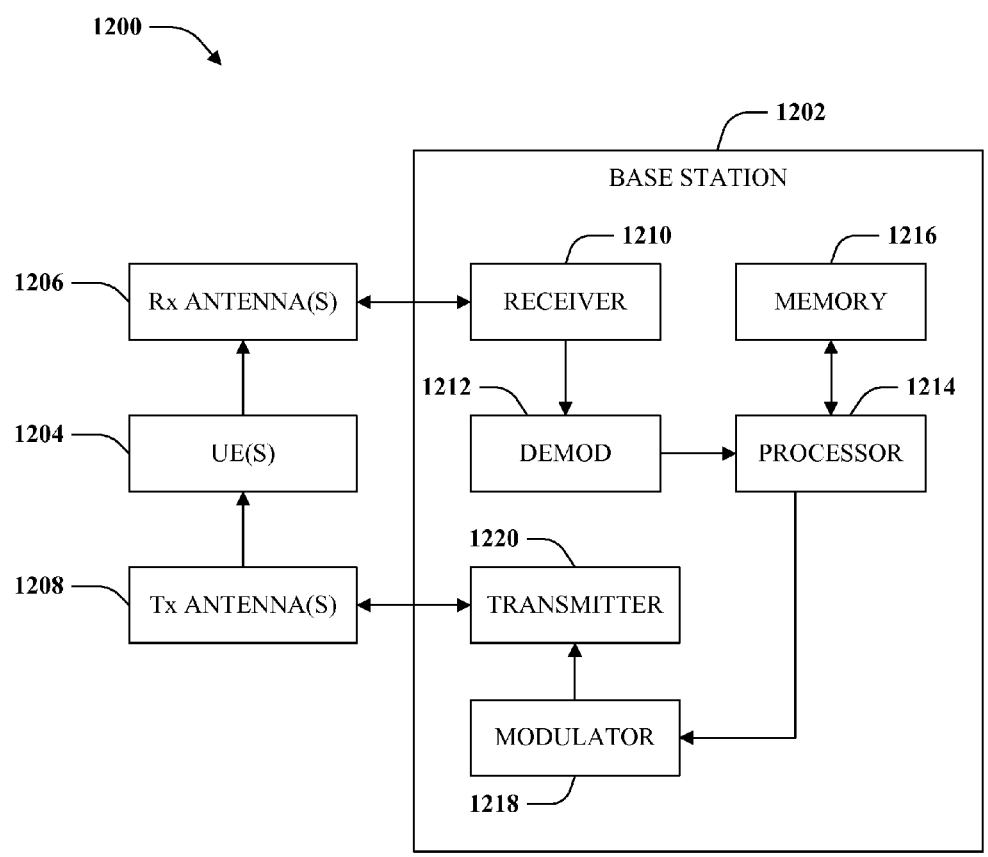

FIG. 12 is a block diagram of a system 1200 that can be utilized to implement various aspects of the functionality described herein. In one example, system 1200 includes a base station or base station 1202. As illustrated, base station 1202 can receive signal(s) from one or more UEs 1204 via one or more receive (Rx) antennas 1206 and transmit to the one or more UEs 1204 via one or more transmit (Tx) antennas 1208. Additionally, base station 1202 can comprise a receiver 1210 that receives information from receive antenna(s) 1206. In one example, the receiver 1210 can be operatively associated with a demodulator (Demod) 1212 that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Base station 1202 can also include a modulator 1218 that can multiplex a signal for transmission by a transmitter 1220 through transmit antenna(s) 1208.

Figure 13:
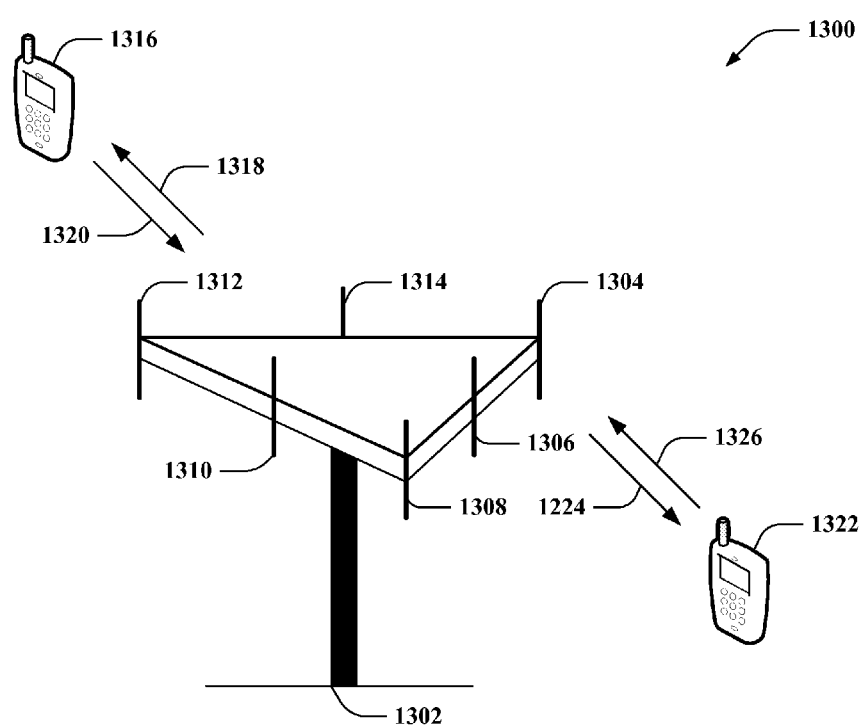
FIG. 13 is an illustration of a wireless communication system in accordance with various aspects set forth herein.

Referring now to FIG. 13, a wireless communication system 1300 is illustrated in accordance with various embodiments presented herein. System 1300 comprises a base station (e.g., access point) 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1302 can communicate with one or more UEs such as UE 1316 and UE 1322; however, it is to be appreciated that base station 1302 can communicate with substantially any number of UEs similar to UEs 1316 and 1322. UEs 1316 and 1322 can be, for example, cellular phones, smart phones, laptops, handheld communication devices, handheld computing devices, satellite radios, global positioning systems, PDAs, and/or any other suitable device for communicating over wireless communication system 1300. As depicted, UE 1316 is in communication with antennas 1312 and 1314, where antennas 1312 and 1314 transmit information to UE 1316 over a downlink 1318 and receive information from UE 1316 over an uplink 1320. Moreover, UE 1322 is in communication with antennas 1304 and 1306, where antennas 1304 and 1306 transmit information to UE 1322 over a downlink 1324 and receive information from UE 1322 over an uplink 1326. In a frequency division duplex (FDD) system, downlink 1318 can utilize a different frequency band than that used by uplink 1320, and downlink 1324 can employ a different frequency band than that employed by uplink 1326, for example. Further, in a time division duplex (TDD) system, downlink 1318 and uplink 1320 can utilize a common frequency band and downlink 1324 and uplink 1326 can utilize a common frequency band.

Each group of antennas and/or the area in which they are designated to communicate can be referred to as a sector of base station 1302. For example, antenna groups can be designed to communicate to UEs in a sector of the areas covered by base station 1302. In communication over downlinks 1318 and 1324, the transmitting antennas of base station 1302 can utilize beamforming to improve signal-to-noise ratio of downlinks 1318 and 1324 for UEs 1316 and 1322. Also, while base station 1302 utilizes beamforming to transmit to UEs 1316 and 1322 scattered randomly through an associated coverage, UEs in neighboring cells can be subject to less interference as compared to a base station transmitting through a single antenna to all its UEs. Moreover, UEs 1316 and 1322 can communicate directly with one another using a peer-to-peer or ad hoc technology (not shown).

According to an example, system 1300 can be a multiple-input multiple-output (MIMO) communication system. Further, system 1300 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1302 can communicate to the UEs 1316 and 1322 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
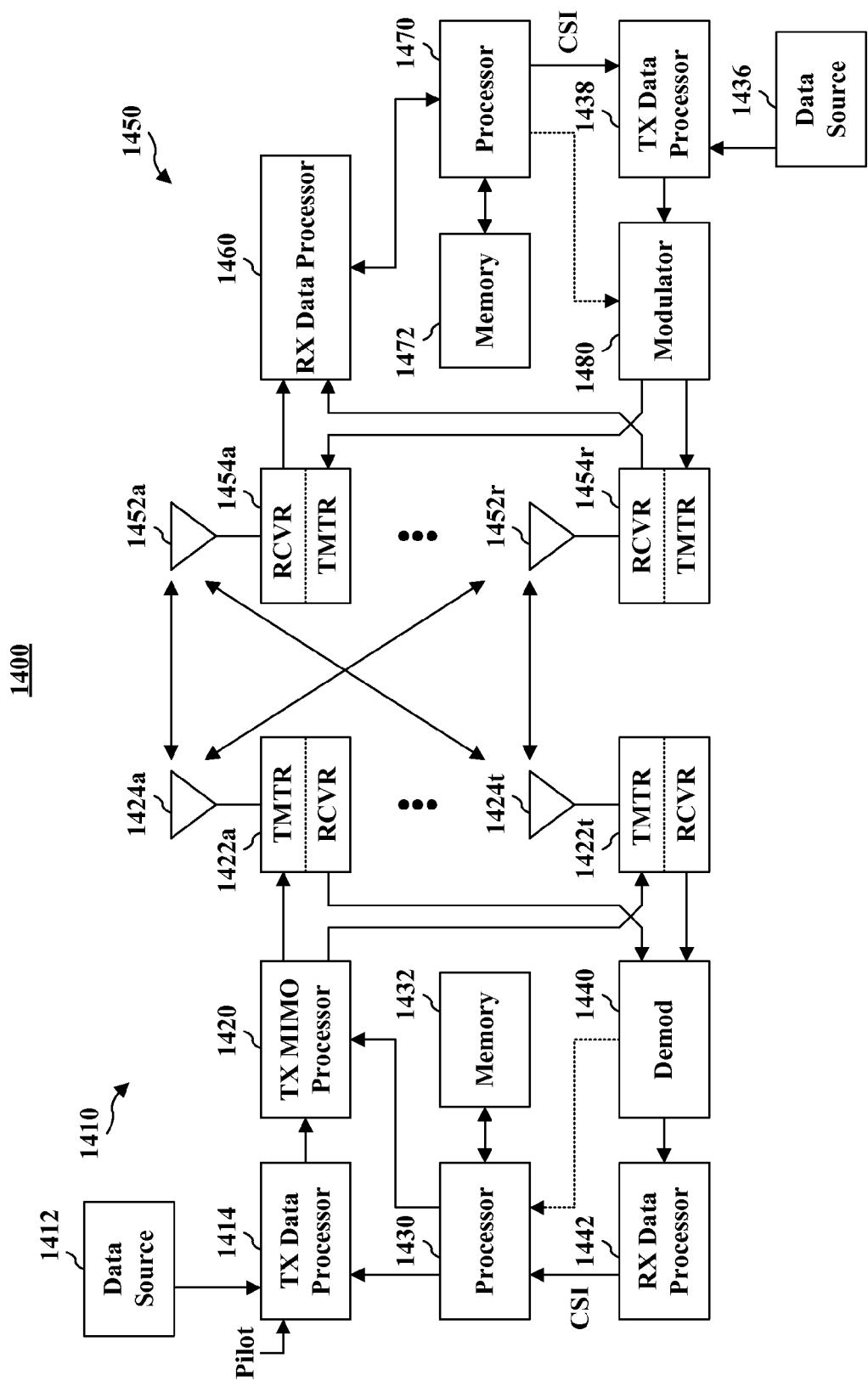
FIG. 14 is a block diagram illustrating an example wireless communication system in which various aspects described herein can function.

FIG. 14 shows an example wireless communication system 1400. The wireless communication system 1400 depicts one base station 1410 and one access terminal 1450 for sake of brevity. However, it is to be appreciated that system 1400 can include more than one base station and/or more than one access terminal, wherein additional base stations and/or access terminals can be substantially similar or different from example base station 1410 and access terminal 1450 described below. In addition, it is to be appreciated that base station 1410 and/or access terminal 1450 can employ the systems (FIGS. 1-5 and FIG. 10) and/or method (FIGS. 6-9) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At access terminal 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which available technology to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from access terminal 1450 are received by antennas 1424, conditioned by receivers 1422, demodulated by a demodulator 1440, and processed by a RX data processor 1442 to extract the reverse link message transmitted by access terminal 1450. Further, processor 1430 can process the extracted message to determine which precoding matrix to use for determining the beamforming weights.

Processors 1430 and 1470 can direct (e.g., control, coordinate, manage, etc.) operation at base station 1410 and access terminal 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    updating one or more serving grants associated with a plurality of carriers based at least in part on one or both of an absolute scheduling grant and a relative scheduling grant received via downlink signaling on the plurality of carriers;
    determining a total power available for high speed uplink packet transmissions, wherein the total power available is shared by the plurality of carriers;
    distributing the total power available across the plurality of carriers, wherein a power distribution of the total power available is jointly determined; and
    selecting a packet format for a carrier from the plurality of carriers, wherein selecting is based at least in part on one of the one or more serving grants associated with the carrier and an amount of power allocated to the carrier.

2. The method of claim 1, wherein the power required to transmit the packet format selected for the carrier is one of equal to or less than the serving grant associated with the carrier.

3. The method of claim 1, wherein distributing the total power available across the plurality of carriers comprises evaluating all carriers from the plurality of carriers together to determine the power distribution.

4. The method of claim 1, wherein distributing the total power available across the plurality of carriers further comprises:
    identifying a retransmission carrier in the plurality of carriers, wherein the retransmission carrier is associated with a retransmission; and
    allocating an amount of power to the retransmission carrier, wherein the amount of power is a power required for the retransmission.

5. The method of claim 4, further comprising distributing, to remaining carriers in the plurality of carriers, any power remaining after allocation of power to the retransmission.

6. The method of claim 1, wherein distributing the total power available comprises employing a water-filling scheme.

7. The method of claim 6, wherein the water-filling scheme includes an optimization search in which a solution of the optimization search maximizes a total data rate across all carriers given the amount of power allocated to each carrier.

8. The method of claim 1, wherein distributing the total power available comprises employing a greedy-filling scheme.

9. The method of claim 8, wherein employing the greedy-filling scheme further comprises:
ranking the plurality of carriers based upon a pilot transmit power associated with each carrier; and
allocating power from the total power available to a highest ranked carrier until at least one of a serving grant associated with the highest ranked carrier is satisfied or the total power available is exhausted.

10. The method of claim 9, further comprising:
determining an amount of remaining power after allocation of power to the highest ranked carrier;
selecting a next highest ranked carrier; and
allocating power from the amount of remaining power until at least one of a serving grant associated with the next highest ranked carrier is satisfied or the amount of remaining power is exhausted.

11. The method of claim 9, further comprising:
iteratively selecting a ranked carrier from the plurality of carriers and allocating power to the carrier until at least one of the total power available is exhausted or each carrier in the plurality of carriers is allocated a portion of power.

12. The method of claim 1, wherein distributing the total power available comprises employing an equal split scheme such that each carrier in the plurality of carriers is allocated an equal share of the total power available.

13. The method of claim 1, wherein the total power available comprises a maximum transmit power with at least one of a transmit power of a dedicated channel (DCH), a transmit power of a control channel, or a transmit power of retransmissions deducted.

14. The method of claim 1, wherein selecting the packet format for the carrier comprises:
classifying each packet format from a set of packet formats as one of supported or blocked based at least in part on the power required to transmit each packet format and the amount of power allocated to the carrier; and
selecting a supported packet format.

15. The method of claim 1, further comprising updating the serving grant associated with the carrier in accordance with a scheduling grant.

16. The method of claim 1, wherein the packet format is an enhanced dedicated channel (E-DCH) transport format combination (E-TFC).

17. A wireless communications apparatus, comprising:
a memory storing executable instructions; and
at least one processor in communication with the memory, wherein the at least one processor is configured to execute the instructions to:
update one or more serving grants associated with a plurality of carriers based at least in part on one or both of an absolute scheduling grant and a relative scheduling grant received via downlink signaling on the plurality of carriers;
determine a total power available for high speed uplink packets transmissions, wherein the total power available is shared by the plurality of carriers;
distribute the total power available across the plurality of carriers in accordance with a power distribution scheme; and
select a packet format for a carrier from the plurality of carriers based at least in part on one of the one or more serving grants associated with the carrier and an amount of power allocated to the carrier.

18. The wireless communications apparatus of claim 17, wherein the at least one processor is further configured to:
compare the power required to transmit each packet format from a set of packet formats with the amount of power allocated to the carrier;
categorize the respective packet format as supported when the power required to transmit the respective packet format is less than or equal to the power allocated to the carrier; and
categorize the respective packet format as blocked when the power required to transmit the respective packet format exceeds the power allocated to the carrier.

19. The wireless communications apparatus of claim 17, wherein the power distribution scheme is a greedy-filling scheme.

20. The wireless communications apparatus of claim 17, wherein the power distribution scheme is a water-filling scheme.

21. The wireless communications apparatus of claim 17, wherein the power distribution scheme is an equal splitting scheme.

22. The wireless communications apparatus of claim 17, wherein the at least one processor is further configured to evaluate all carriers from the plurality of carriers together to apply the power distribution scheme.

23. The wireless communications apparatus of claim 17, wherein the at least one processor is further configured to:
receive a scheduling grant on a carrier; and
update a serving grant associated with the carrier in accordance with the scheduling grant.

24. An apparatus, comprising:
means for updating one or more serving grants associated with a plurality of carriers based at least in part on one or both of an absolute scheduling grant and a relative scheduling grant received via downlink signaling on the plurality of carriers;
means for determining a total power available for high speed uplink packet transmissions, wherein the total power available is shared by the plurality of carriers;
means for distributing the total power available across the plurality of carriers, wherein a power distribution of the total power available is jointly determined; and
means for selecting a packet format for a carrier from the plurality of carriers, wherein selecting is based at least in part on one of the one or more serving grants associated with the carrier and an amount of power allocated to the carrier.

25. The apparatus of claim 24, further comprising means for evaluating all carriers from the plurality of carriers together to determine the power distribution.

26. The apparatus of claim 24, wherein the power distribution conforms to a water-filling scheme.

27. The apparatus of claim 24, wherein the power distribution conforms to a greedy-filling scheme.

28. The apparatus of claim 24, wherein the power distribution conforms to an equal split scheme such that each carrier in the plurality of carriers is allocated an equal share of the total power available.

29. The apparatus of claim 24, wherein the total power available comprises a maximum transmit power with at least one of a transmit power of a dedicated channel (DCH), a transmit power of a control channel, or a transmit power of retransmissions deducted.

30. The apparatus of claim 24, wherein the means for selecting the packet format for the carrier comprises:
means for classifying each packet format from a set of packet formats as one of supported or blocked based at least in part on the power required to transmit each packet format and the amount of power allocated to the carrier; and
means for employing a supported packet format.

31. The apparatus of claim 24, further comprising means for updating the serving grant associated with the carrier in accordance with a scheduling grant.

32. A computer program product, comprising:
a non-transitory computer-readable medium, comprising:
code for causing at least one computer to update one or more serving grants associated with a plurality of carriers based at least in part on one or both of an absolute scheduling grant and a relative scheduling grant received via downlink signaling on the plurality of carriers;
code for causing at least one computer to determine a total power available for high speed uplink packets transmissions, wherein the total power available is shared by the plurality of carriers;
code for causing the at least one computer to distribute the total power available across the plurality of carriers in accordance with a power distribution scheme; and
code for causing the at least one computer to select a packet format for a carrier from the plurality of carriers based at least in part on one of the one or more serving grants associated with the carrier and an amount of power allocated to the carrier.

33. The computer program product of claim 32, wherein the computer-readable medium further comprises:
code for causing the at least one computer to compare the power required to transmit each packet format from a set of packet formats with the amount of power allocated to the carrier;
code for causing the at least one computer to categorize the respective packet format as supported when the power required to transmit the respective packet format is less than or equal to the power allocated to the carrier; and
code for causing the at least one computer to categorize the respective packet format as blocked when the power required to transmit the respective packet format exceeds the power allocated to the carrier.

34. The computer program product of claim 32, wherein the power distribution scheme is a greedy-filling scheme.

35. The computer program product of claim 32, wherein the power distribution scheme is a water-filling scheme.

36. The computer program product of claim 32, wherein the power distribution scheme is an equal splitting scheme.

37. The computer program product of claim 32, wherein the computer-readable medium further comprises code for causing the at least one computer to evaluate all carriers from the plurality of carriers together to apply the power distribution scheme.

38. The computer program product of claim 32, wherein the computer-readable medium further comprises:
code for causing the at least one computer to receive a scheduling grant on a carrier; and
code for causing the at least one computer to update a serving grant associated with the carrier in accordance with the scheduling grant.

39. An apparatus, comprising:
a media access control (MAC) module that updates one or more serving grants associated with a plurality of component carriers based at least in part on one or both of an absolute scheduling grant and a relative scheduling grant received via downlink signaling on the plurality of carriers;
a power split module that distributes a total available power among the plurality of component carriers in accordance with a power distribution scheme;
a format evaluation module, comprising hardware, that categorizes a set of packet formats for a component carrier in the plurality of component carriers based at least in part on a power required to transmit each packet format, a serving grant associated with the carrier and an amount of power allocated to the component carrier by the power split module; and
a format selection module that selects a packet format from the set of packet formats for utilization in an uplink transmission on one of the one or more component carriers.

40. The apparatus of claim 39, further comprising a request module that generates a scheduling request for at least one component carrier of the plurality of component carriers, wherein the scheduling request is generated at least in part on the amount of power allocated to the component carrier by the power split module.

41. The apparatus of claim 39, wherein the power distribution scheme is a greedy-filling scheme.

42. The apparatus of claim 39, wherein the power distribution scheme is a water-filling scheme.

43. The apparatus of claim 39, wherein the power distribution scheme is an equal splitting scheme.

44. The apparatus of claim 39, wherein the format evaluation module categorizes each packet format from a set of packet formats as one of supported or blocked based at least in part on the power required to transmit each packet format and the amount of power allocated to the carrier, and wherein the format selection module selects a supported packet format.

45. The apparatus of claim 44, wherein the format selection module selects the supported packet format that maximizes a data rate of the apparatus within constraints of the serving grant associated with the component carrier.

46. The method of claim 14, wherein selecting the supported packet format further comprises selecting the supported packet format that maximizes a data rate of the apparatus within constraints of the serving grant associated with the component carrier.

47. The wireless communications apparatus of claim 18, wherein the at least one processor is further configured to select a supported packet format.

48. The wireless communications apparatus of claim 47, wherein the at least one processor is further configured to select the supported packet format that maximizes a data rate of the apparatus within constraints of the serving grant associated with the carrier.

49. The apparatus of claim 30, wherein the means for employing the supported packet format further comprises means for employing the supported packet format that maximizes a data rate of the apparatus within the constraints of the serving grant associated with the carrier.

50. The computer program product of claim 33, wherein the computer-readable medium further comprises:
code for causing the at least one computer to select a supported packet format.

51. The computer program product of claim 50, wherein the computer-readable medium further comprises:
  code for causing the at least one computer to select the supported packet format that maximizes a data rate within the constraints of the serving grant associated with the carrier.

52. A method, comprising:
  determining a total power available for high speed uplink packet transmissions, wherein the total power available is shared by a plurality of carriers;
  distributing the total power available across the plurality of carriers, wherein a power distribution of the total power available is jointly determined; and
  selecting a packet format for a carrier from the plurality of carriers, wherein selecting is based at least in part a serving grant associated with the carrier and an amount of power allocated to the carrier, and wherein selecting the packet format for the carrier comprises:
    classifying each packet format from a set of packet formats as one of supported or blocked based at least in part on the power required to transmit each packet format and the amount of power allocated to the carrier; and
    selecting a supported packet format that maximizes a data rate of the apparatus within constraints of the serving grant associated with the component carrier.

53. A wireless communications apparatus, comprising:
  a memory storing executable instructions; and
  at least one processor in communication with the memory, wherein the at least one processor is configured to execute the instructions to:
    determine a total power available for high speed uplink packets transmissions, wherein the total power available is shared by a plurality of carriers;
    distribute the total power available across the plurality of carriers in accordance with a power distribution scheme; and
    select a packet format for a carrier from the plurality of carriers based at least in part on a power required to transmit each packet format, a serving grant associated with the carrier and an amount of power allocated to the carrier, and
    wherein the at least one processor is configured to execute the instructions to select the packet format for the carrier by:
      classifying each packet format from a set of packet formats as one of supported or blocked based at least in part on the power required to transmit each packet format and the amount of power allocated to the carrier; and
      selecting a supported packet format that maximizes a data rate of the apparatus within constraints of the serving grant associated with the component carrier.

54. A method, comprising:
  determining a total power available for high speed uplink packet transmissions, wherein the total power available is shared by a plurality of carriers;
  distributing the total power available across the plurality of carriers, wherein a power distribution of the total power available is jointly determined;
  selecting a packet format for a carrier from the plurality of carriers, wherein selecting is based at least in part a serving grant associated with the carrier and an amount of power allocated to the carrier;
  comparing the power required to transmit each packet format from a set of packet formats with the amount of power allocated to the carrier;
  categorizing the respective packet format as supported when the power required to transmit the respective packet format is less than or equal to the power allocated to the carrier; and
  categorizing the respective packet format as blocked when the power required to transmit the respective packet format exceeds the power allocated to the carrier.

55. A wireless communications apparatus, comprising:
  a memory storing executable instructions; and
  at least one processor in communication with the memory, wherein the at least one processor is configured to execute the instructions to:
    determine a total power available for high speed uplink packets transmissions, wherein the total power available is shared by a plurality of carriers;
    distribute the total power available across the plurality of carriers in accordance with a power distribution scheme;
    select a packet format for a carrier from the plurality of carriers based at least in part on a power required to transmit each packet format, a serving grant associated with the carrier and an amount of power allocated to the carrier;
    compare the power required to transmit each packet format from a set of packet formats with the amount of power allocated to the carrier;
    categorize the respective packet format as supported when the power required to transmit the respective packet format is less than or equal to the power allocated to the carrier; and
    categorize the respective packet format as blocked when the power required to transmit the respective packet format exceeds the power allocated to the carrier.

* * * * *